US008700866B2

(12) United States Patent
Ikeda

(10) Patent No.: US 8,700,866 B2
(45) Date of Patent: Apr. 15, 2014

(54) DATA TRANSFER APPARATUS, DATA TRANSFER DEVICE, AND DATA TRANSFER METHOD IN A DATA TRANSFER DEVICE

(75) Inventor: Junichi Ikeda, Miyagi (JP)

(73) Assignee: Ricoh Company, Limited, Tokyo (JP)

( * ) Notice: Subject to any disclaimer, the term of this patent is extended or adjusted under 35 U.S.C. 154(b) by 287 days.

(21) Appl. No.: 12/880,610

(22) Filed: Sep. 13, 2010

(65) Prior Publication Data

US 2011/0066822 A1 Mar. 17, 2011

(30) Foreign Application Priority Data

Sep. 14, 2009 (JP) ................................. 2009-212471
May 28, 2010 (JP) ................................. 2010-123480

(51) Int. Cl.
*G06F 12/00* (2006.01)
(52) U.S. Cl.
USPC ........................................ 711/149; 711/170
(58) Field of Classification Search
USPC ................................................ 711/149, 170
See application file for complete search history.

(56) References Cited

U.S. PATENT DOCUMENTS

| 5,673,322 A * | 9/1997 | Pepe et al. ...................... 705/52 |
| 2005/0080874 A1* | 4/2005 | Fujiwara et al. ............... 709/217 |
| 2006/0195625 A1* | 8/2006 | Hesse ................................ 710/8 |
| 2008/0219204 A1* | 9/2008 | Lee et al. ........................ 370/315 |
| 2009/0010159 A1* | 1/2009 | Brownell et al. ............... 370/231 |
| 2009/0268747 A1* | 10/2009 | Kurata et al. ................... 370/412 |

FOREIGN PATENT DOCUMENTS

| JP | 2000-332791 | 11/2000 |
| JP | 2005-122235 | 5/2005 |
| JP | 2007-180611 | 7/2007 |
| JP | 2008-60700 | 3/2008 |
| JP | 2009-9556 | 1/2009 |
| JP | 2009-151752 | 7/2009 |
| JP | 2010-33125 | 2/2010 |

* cited by examiner

*Primary Examiner* — Hashem Farrokh
(74) *Attorney, Agent, or Firm* — Oblon, Spivak, McClelland, Maier & Neustadt, L.L.P.

(57) ABSTRACT

A data transfer apparatus includes: a first port and a second port that communicate data; a memory unit that stores the data; and a securing unit that secures, when a first time period starting from transmission of data up to reception of a response to transmitted data at the first port is longer than a second time period starting from transmission of data up to reception of a response to transmitted data at the second port, a first memory space that is used in data transfer in the first port so as for the first memory space to have a larger size than a size of a second memory space used in data transfer in the second port.

10 Claims, 27 Drawing Sheets

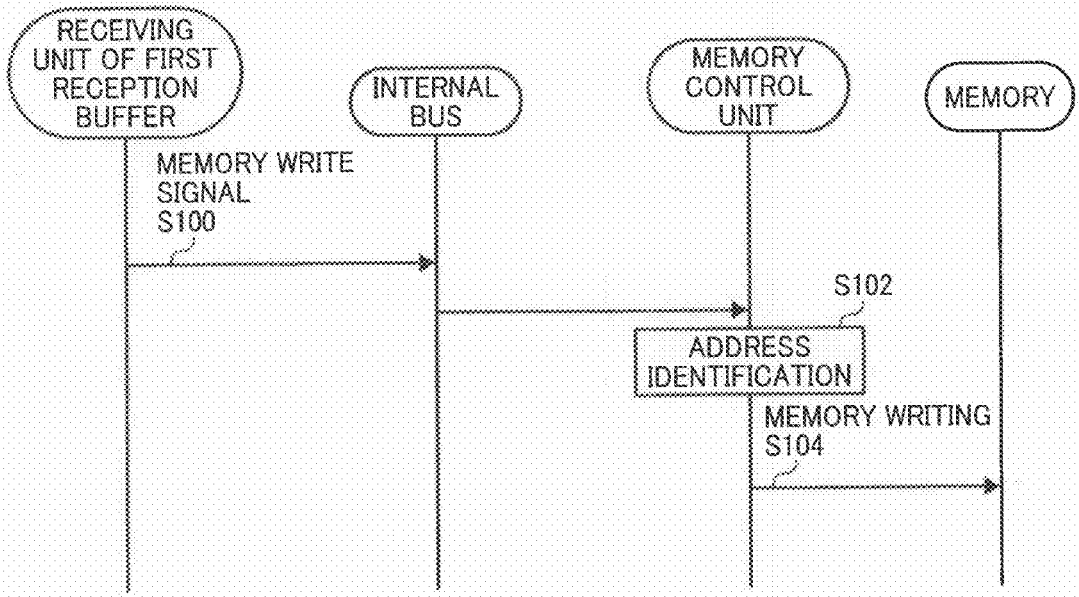
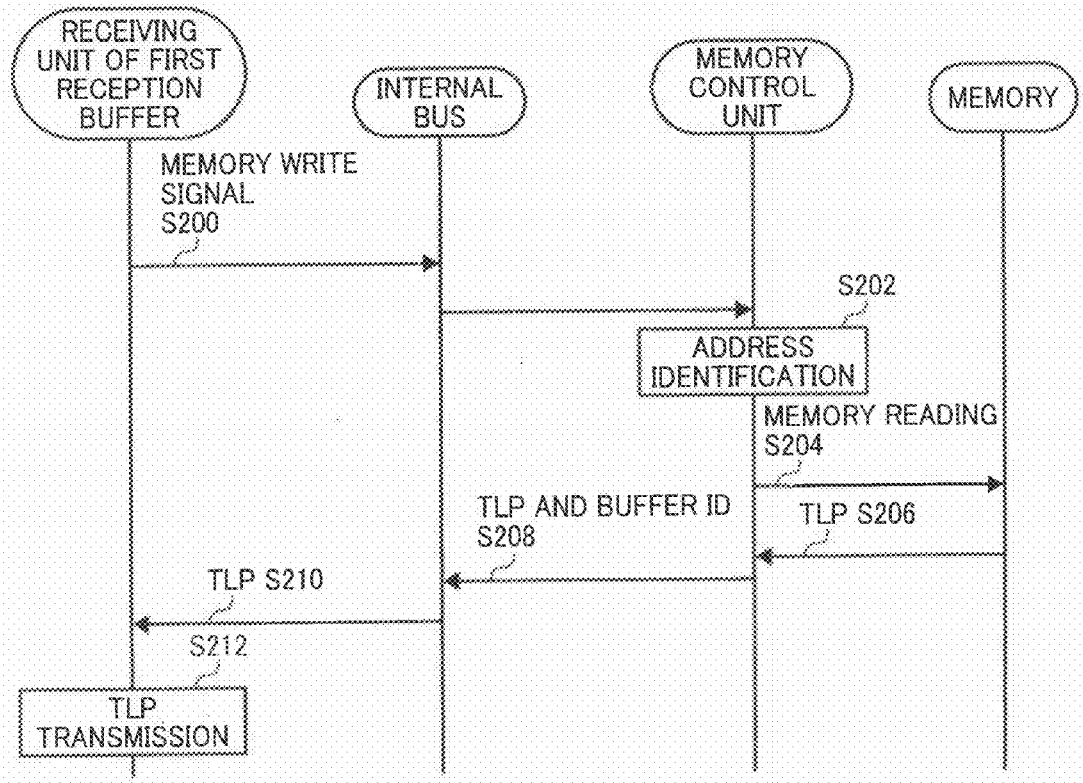

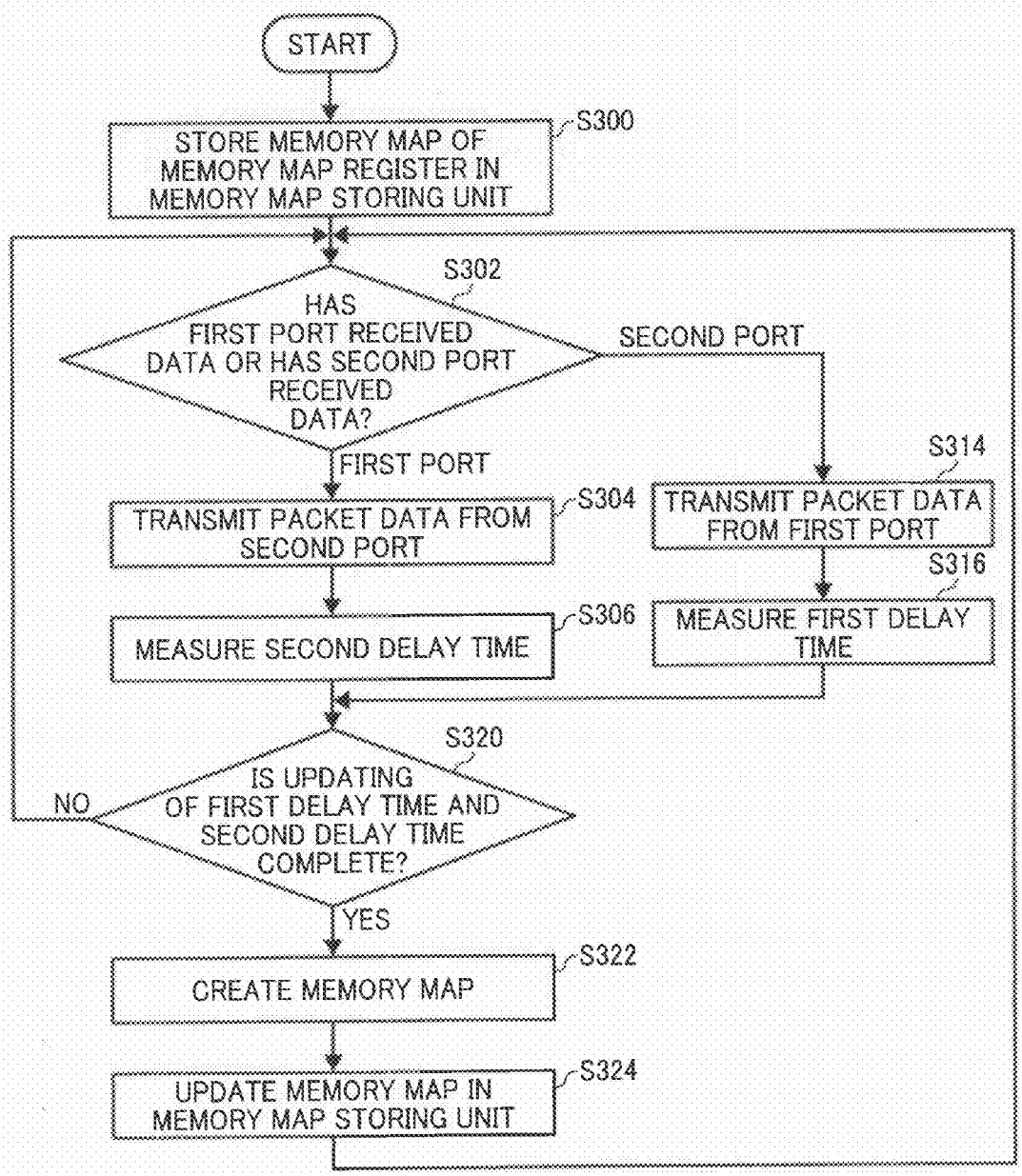

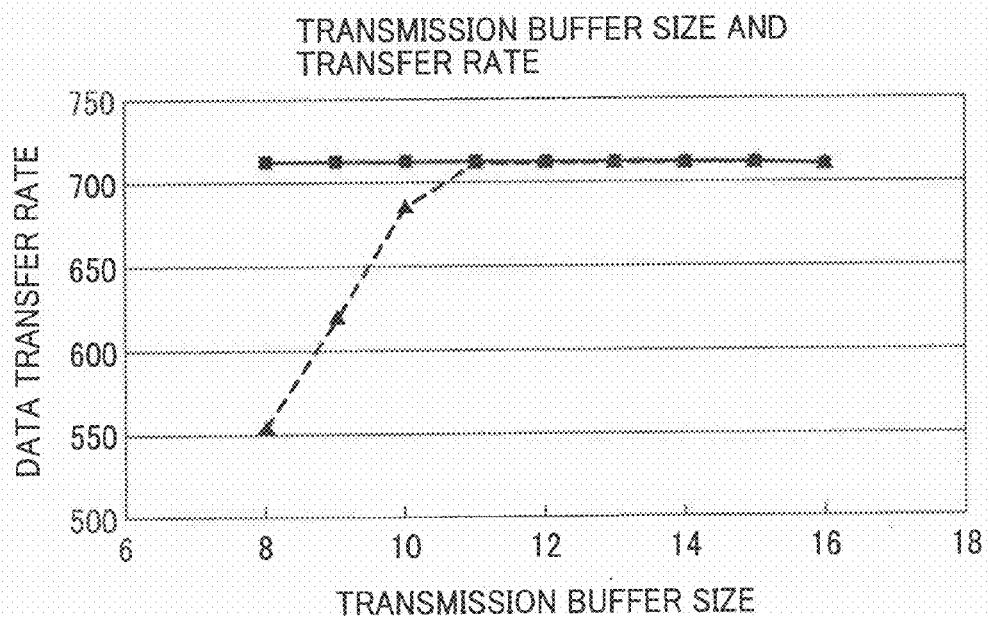
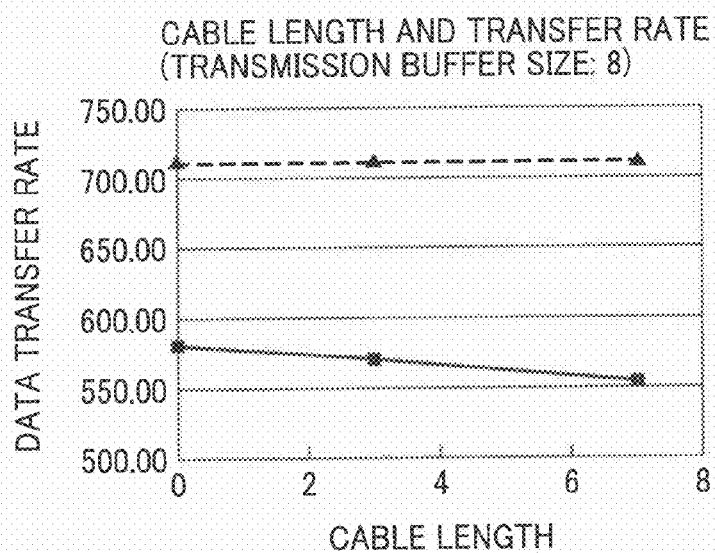

FIG. 12
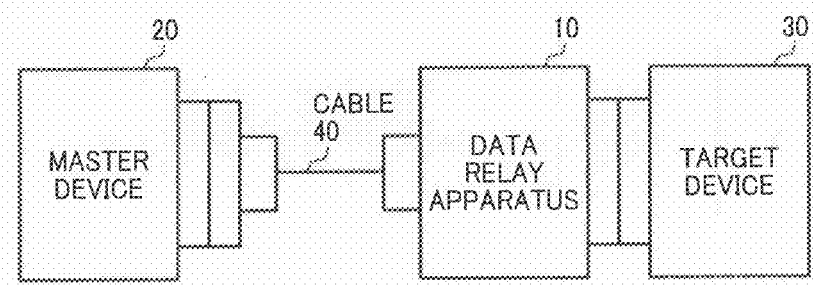
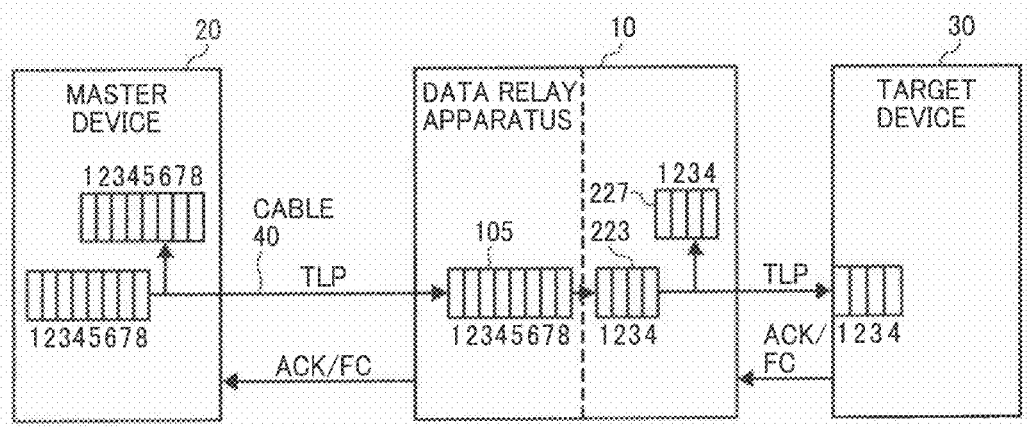

FIG. 14
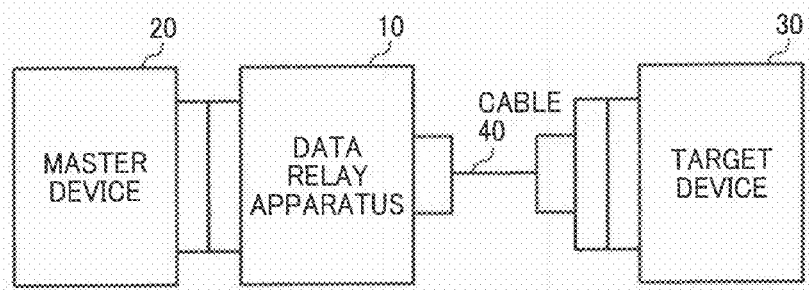
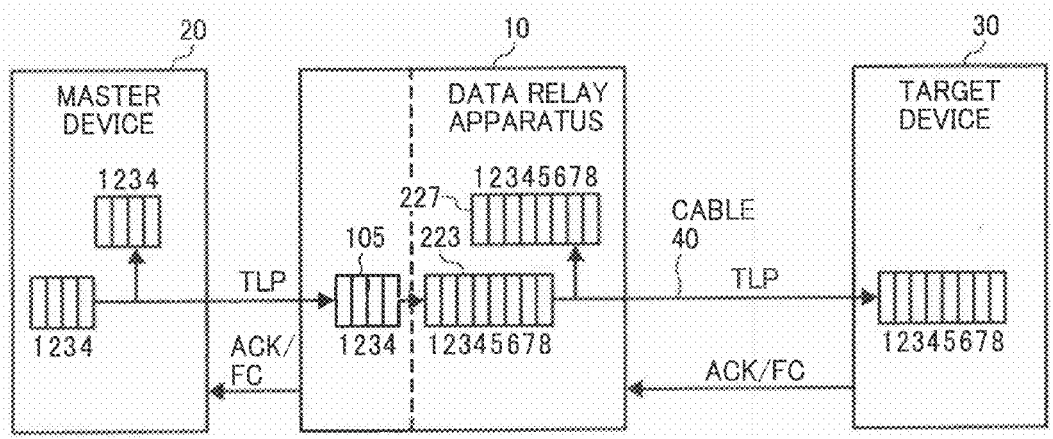

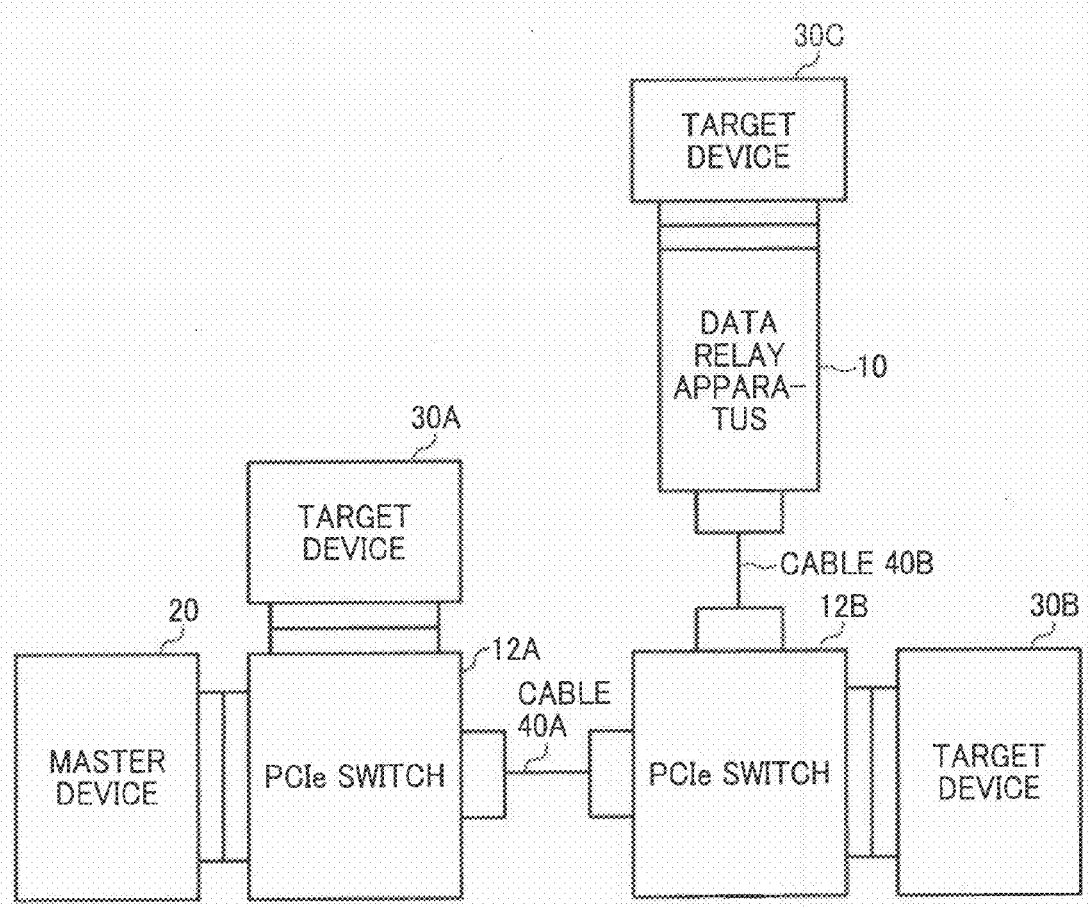

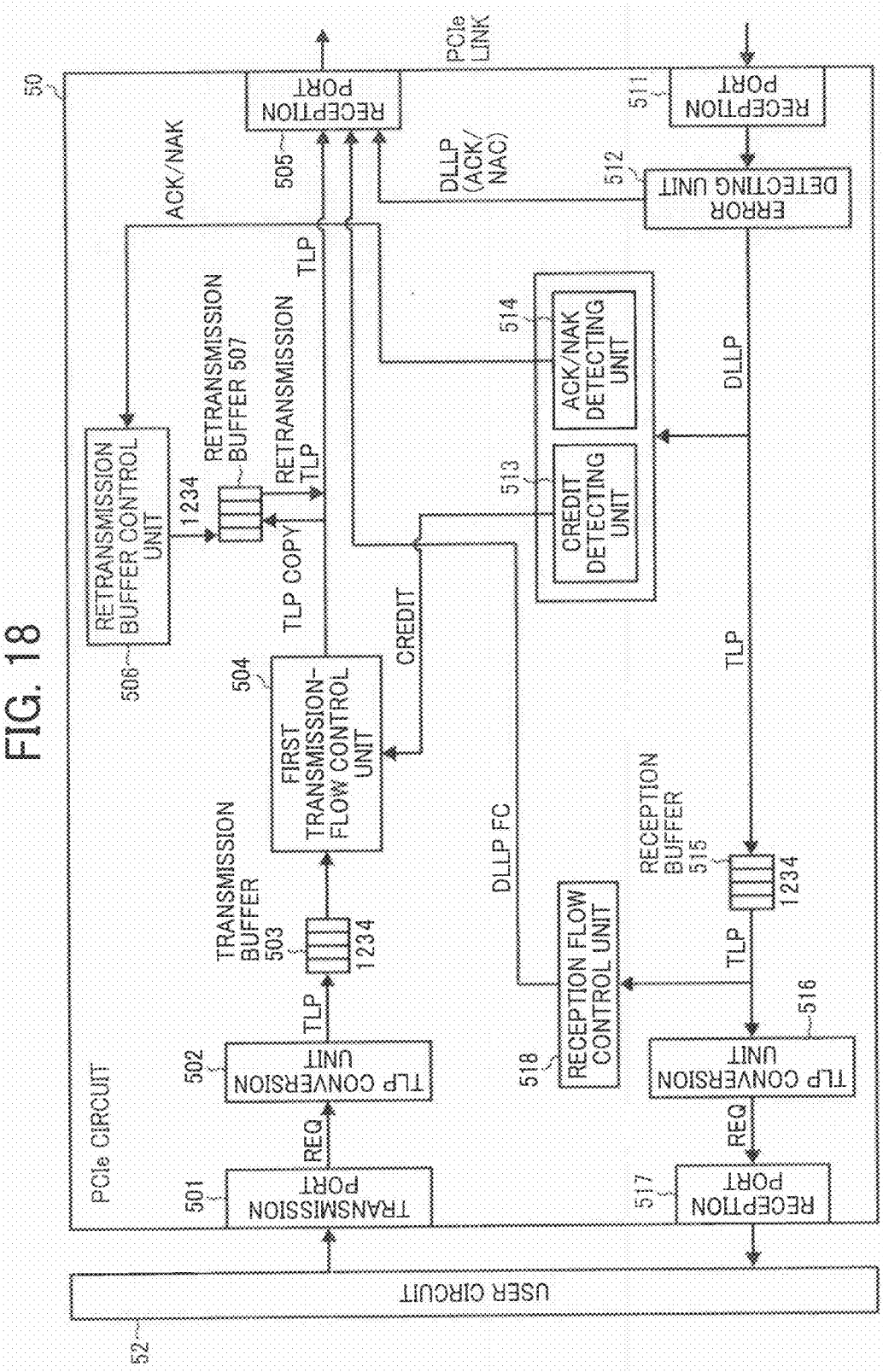

LATENCY IS SHORT

PATH LATENCY IS LONG

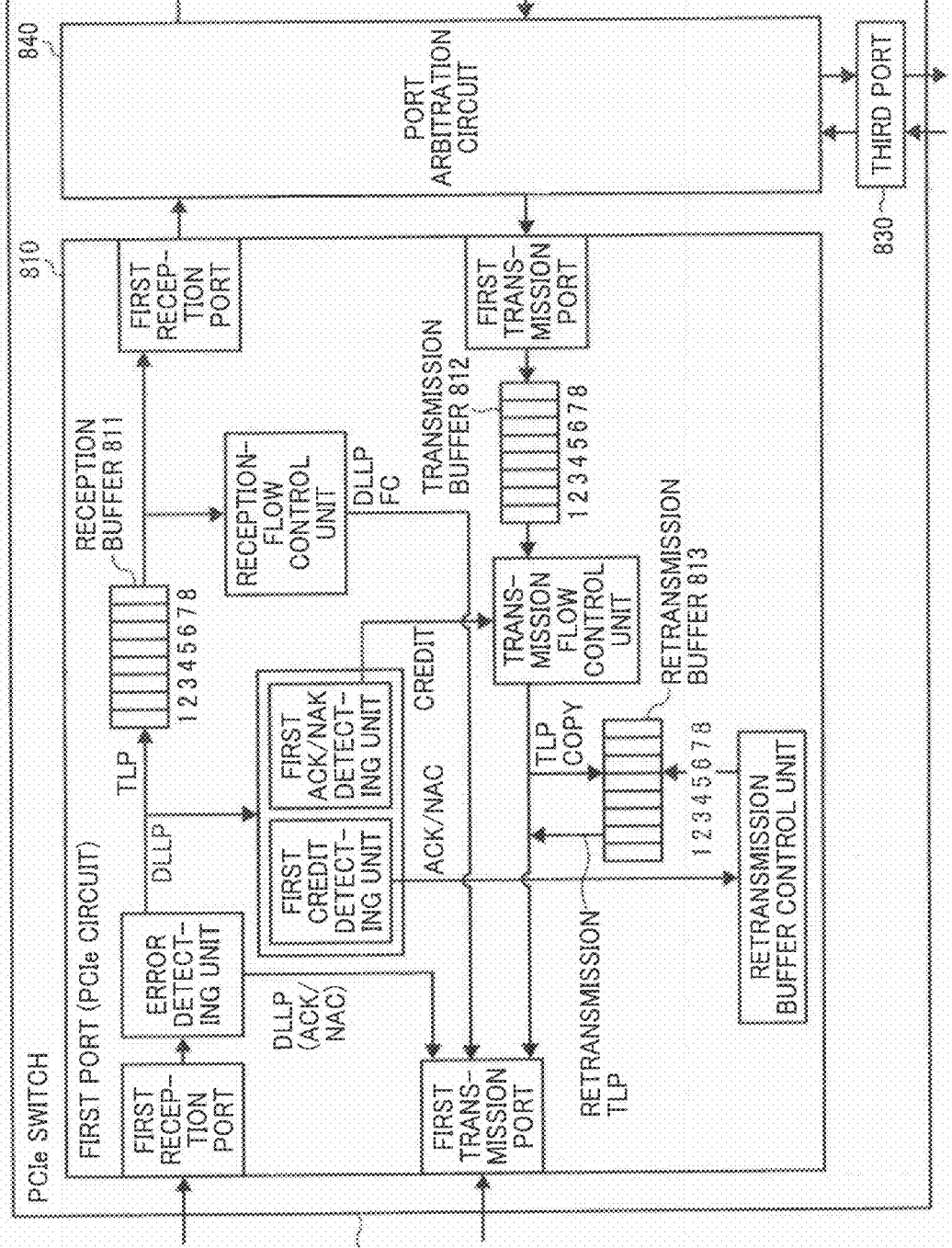

2-WIRE SERIAL ADDRESS, 1010000 x (A0h)"

| Offset | Field | Size |
|---|---|---|
| 0 | ID AND STATUS | (3 Bytes) |
| 2 | INTERRUPT FLAGS | (19 Bytes) |
| 21 | MODULE MONITORS | (12 Bytes) |
| 33 | CHANNEL MONITORS | (48 Bytes) |
| 81 | RESERVED | (4 Bytes) |
| 85 | CONTROL | (12 Bytes) |
| 97 | RESERVED | (2 Bytes) |
| 99 | MODULE AND CHANNEL MASK | (7 Bytes) |
| 106 | RESERVED | (12 Bytes) |
| 118 | PASSWORD CHANGE ENTRY AREA (OPTIONAL) | (4 Bytes) |
| 122 | PASSWORD ENTRY AREA (OPTIONAL) | (4 Bytes) |
| 126 | PAGE SELECT BYTE | (1 Byte) |
| 127 | | |

2701

PAGE 00
| Offset | Field | Size |
|---|---|---|
| 128 | BASE ID FLELOS | (64 Bytes) |
| 191 | | |
| 223 | Extended ID | (32 Bytes) |
| 225 | Vendor SPECIFIC ID | (32 Bytes) |

PAGE 01 (OPTIONAL)
| Offset | Field | Size |
|---|---|---|
| 128 | CHAPS | (1 Byte) |
| 128 | | |
| 129 | AST TABLE LENGTH (TL) | (1 Byte) |
| 131 | APPLICATION CODE ENTRY 0 | (2 Bytes) |
| 133 | APPLICATION CODE ENTRY 1 | (2 Bytes) |
| | OTHER ENDLESS | |
| 255 | APPLICATION CODE ENTRY TL | (2 Bytes) |

| ADDRESS | SIZE (Bytes) | NAME | DESCRIPTION OF BASE ID FIELD |
|---|---|---|---|
| BASE ID fields | | | |
| ⋮ | ⋮ | ⋮ | ⋮ |
| 142 | 1 | LENGTH (SMF) | LINK LENGTH SUPPORTED FOR SMF FIBER IN km (note 1) |
| 143 | 1 | LENGTH (OM3 50 $\mu$m) | LINK LENGTH SUPPORTED FOR EBW 50/125 $\mu$m FIBER (OM3), UNITS OF 2m (note 1) |
| 144 | 1 | LENGTH (OM II 50 $\mu$m) | LINK LENGTH SUPPORTED FOR 50/125 $\mu$m fiber (OM2), UNITS OF 1m (note1) |
| 145 | 1 | LENGTH (OM1 62.5 $\mu$m) | Link LENGTH SUPPORTED FOR 62.5/125 $\mu$m FIBER (OM1), UNITS OF 1m (note 1) |
| 146 | 1 | LENGTH (COPPER) | LINK LENGTH SUPPORTED FOR COPPER or ACTIVE CABLE, UNITS OF 1m (note 1) |

DATA TRANSFER APPARATUS, DATA TRANSFER DEVICE, AND DATA TRANSFER METHOD IN A DATA TRANSFER DEVICE

CROSS-REFERENCE TO RELATED APPLICATIONS

The present application claims priority to and incorporates by reference the entire contents of Japanese Patent Application No. 2009-212471 filed in Japan on Sep. 14, 2009 and Japanese Patent Application No. 2010-123480 filed in Japan on May 28, 2010.

BACKGROUND OF THE INVENTION

1. Field of the Invention

The present invention relates to a data transfer apparatus including communication ports for communicating packet data, relates to a data transfer device, and relates to a data transfer method for a data transfer apparatus.

2. Description of the Related Art

The high-speed serial transmission technology using such as the peripheral component interconnect (PCI) express (hereinafter, referred to as "PCIe") technology has become popular and is also being implemented for image buses installed in multifunction peripherals or the like. In recent years, along with the popularization of the PCIe technology, there has been a rise in demands for expanding the implementation of the high-speed serial transmission technology into inter-device communication via cables, not confining the use only to the inside of devices. Consider the implementation of the high-speed serial transmission technology into multifunction peripherals. For example, if the controller and the printing apparatus in a large-scale printer that is used in the printing industry are disposed apart from each other; then it is conceivable to connect the image data bus by a cable.

One characteristic of the high-speed serial transmission technology is splitting data into packets for transmission. As compared to the typical parallel data transmission technology, the serial data transmission technology is operated on a wider data transfer bandwidth but at the same time has an increased delay time required for transfer. Hence, in the case of long-distance transmission using a cable, if a device having no consideration given to cable connection is connected as it is; then the increased delay time due to the cable connection causes a delay in receiving acknowledgment (ACK) packets as the response from addressee devices. That leads to the occurrence of timeouts thereby causing to decline in the data transfer rate.

Explained below is the basic operational concept of the PCIe technology. FIG. 18 is a schematic diagram of an exemplary internal configuration of a common master device and a common target device employed in the PCIe technology. Firstly, consider a case when a PCIe circuit 50 functions as a master device. In that case, regarding a request (a memory write request or a memory read request, REQ) issued by a user circuit 52 to the PCIe circuit 50; the request reaches a TLP conversion unit 502 via a transmission port (TX) 501 and gets converted into a packet called a transaction layer packet (TLP) by the TLP conversion unit 502 so as to be stored in a transmission buffer 503.

Subsequently, a transmission flow control unit 504 determines whether a free space is available in the reception buffer of the addressee device. If a free space is available in the reception buffer of the addressee device, then a transmission port (TX) 505 transmits the TLP that has been stored in the transmission buffer 503.

The free space in the reception buffer of the addressee device is managed on the basis of credit information that is reported by the addressee device in a flow control (FC) packet. A reception port (RX) 511 receives the FC packet from the addressee device. Then, a credit detecting unit 513 detects a credit value from the FC packet and reports the credit value to the transmission flow control unit 504.

In order to enable TLP retransmission if the TLP that is transmitted via the transmission flow control unit 504 gets destroyed due to an error, a copy of the contents of the transmitted TLP is temporarily stored in a retransmission buffer 507. The addressee device responds with an ACK packet or a negative acknowledgement (NAK) packet as a notification about whether the TLP was received in the normal condition or not. Herein, the ACK packet indicates that the TLP was normally transmitted to the addressee device, while the NAK packet indicates that the TLP was not normally transmitted to the addressee device. An ACK/NAK detecting unit 514 detects whether the received packet is an ACK packet or an NAK packet, and reports the information regarding the same to a retransmission buffer control unit 506.

If an ACK packet is reported to have been received, then the retransmission buffer control unit 506 revokes the contents of the TLP stored in the retransmission buffer 507 under the assumption that the transmitted TLP has reached the addressee device in the normal condition. On the other hand, if an NAK packet is reported to have been received, then the retransmission buffer control unit 506 retransmits the TLP stored in the retransmission buffer 507 under the assumption that the transmitted TLP did not reach the addressee device in the normal condition.

Consider a case when the PCIe circuit 50 functions as a target device. When a TLP transmitted by a source device reaches the reception port (RX) 511, an error detecting unit 512 detects errors in the TLP on the basis of a cyclic redundancy check (CRC) value. If no error is detected, then the error detecting unit 512 transmits an ACK packet to the transmission port 505. On the other hand, if an error is detected, then the error detecting unit 512 transmits an NAK packet to the transmission port (TX) 505 and revokes the received TLP. When no error is detected, the received TLP is stored in a reception buffer 515. Besides, a TLP conversion unit 516 converts the received TLP into a request (REQ) that is compatible to the user circuit 52 and then transfers that request to the user circuit 52 via a reception port (RX) 517.

The transfer of the request to the user circuit 52 leads to the creation of a free space in the reception buffer 515. Then, a reception flow control unit 518 transmits, to the transmission port 505, an FC packet including the size of that free space as the credit information.

Meanwhile, generally, packets used to hold requests or data are referred to as TLPs; while packets such as ACK packets, NAK packets, and FC packets used for the control purpose are referred to as data link layer packets (DLLPs).

In this way, in the high-speed serial technology implemented for the packet transfer by a PCIe device; using a reception buffer, a transmission buffer, and a retransmission buffer enables achieving efficient data transfer as well as enables ensuring transmission of the data by allowing retransmission in case of errors. Each buffer is designed to have the optimum size with respect to the delay time taken for packet transfer with the addressee device or with respect to the processing capacity of each device. In a device having no consideration given to cable connection, the short delay time leads to a decrease in the installation cost. Thus, the configuration does not include large-sized buffers. Meanwhile, in the example illustrated in FIG. 18, each buffer is designed to store four packets.

FIG. 19A is a schematic diagram of an example when a master device 60 and a target device 70 are directly connected to each other. FIG. 19B is a schematic diagram of buffer configurations of the master device 60 and the target device 70. Herein, a transmission buffer 61 and a retransmission buffer 62 in the master device 60 and a reception buffer 71 in the target device 70 are 4-step buffers. Thus, a maximum of four TLPs can be issued before an ACK packet or an FC packet is received in response. When the master device 60 is directly connected to the target device 70 as illustrated in FIG. 19A, the response delay is short as illustrated by arrows in FIG. 19C and the reception of the first ACK packet/FC packet starts before completing the transmission of four TLPs. That makes it possible to keep transmitting the TLPs in an efficient manner without having to wait for the creation of a free space.

In contrast, as illustrated in FIGS. 20A and 20B, if the master device 60 and the target device 70 are connected by a cable, then there occurs an increase in the transmission path delay caused due to the cable length. In the exemplary timing diagram illustrated in FIG. 20C, the first ACK packet/FC packet is not received in response even after completing the transmission of four TLPs. Hence, the period up to the point of time when the subsequent four TLPs can be transmitted happens to be the transfer downtime. In this way, as compared to the case when the master device 60 and the target device are directly connected to each other, the data transfer efficiency decreases when the master device 60 and the target device are connected by a cable. From the exemplary timing diagram illustrated in FIG. 20C, it can be anticipated that about 6-step buffers to 8-step buffers are required to absorb the response delay.

FIG. 21 is a graph of an example of the relation between the transmission buffer size and the data transfer rate of the master device and the target device when a PCIe device is extended with a PCIe cable. FIG. 22 is a graph of an example of the relation between the cable length and the data transfer rate when a PCIe device is extended with a PCIe cable. In FIGS. 21 and 22, the vertical axis represents the data transfer rate at the time when memory read requests of 128 bytes per request are continuously issued by a PCIe x4 lane connection.

From the graph illustrated in FIG. 21, it can be understood that the data transfer rate starts to decrease when the transmission buffer size of the master device becomes equal to or less than 10. That happens because of a response wait time that is created when, after issuing the read requests equivalent to the transmission buffer size, the master device stops issuing subsequent requests until an ACK packet or an FC packet is received in response from the target device. In the graph illustrated in FIG. 22, the data transfer rate is given for a case when the transmission buffer size is fixed to eight, at which the data transfer rate decreases in the graph illustrated in FIG. 21, but when the cable length is varied. From the graph illustrated in FIG. 22, it can be understood that longer the cable length, larger is the decrease in the data transfer rate. In a condition when the data transfer rate decreases due to insufficient transmission buffer size, the time taken by the number of packets increased as a result of an increase in the cable length to pass through the cable is added as it is to the response wait time. For that reason, longer the cable length, longer is the response wait time and larger is the decrease in the data transfer efficiency. Meanwhile, in a condition when the transmission buffer size is sufficiently large against the response delay occurring due to the cable length, the increase in the time taken for cable propagation is not added to the response wait time. Hence, the data transfer rate does not decrease corresponding to the cable length as illustrated in the graph in FIG. 22.

With the purpose of achieving a high data transfer rate in the case of cable connection; a technology is disclosed for absorbing the transmission path delay by reconfiguring the master device, which functions as the transmission source, and the target device, which functions as the transmission destination, to include large buffers. Meanwhile, in the universal serial bus (USB) technology, in order to prevent timeouts occurring due to the cable extension while waiting for an ACK packet, a connection adaptor has been disclosed for the purpose of inserting a temporary buffer in the transmission path prior to the entry in the cable (e.g., see Japanese Patent Application Laid-open No. 2000-332791). Regarding the PCIe technology, a technology has been disclosed for nullifying the effect of the delay time by inserting a PCIe switch device including large-sized internal buffers.

FIG. 23 is a schematic diagram of an example of the conventional technology according to which a PCIe switch 80 is inserted in the transmission path between the master device 60 and the target device 70. FIG. 24 is a schematic diagram of an exemplary internal configuration of the common PCIe switch 80 in the conventional technology. From among three ports, namely, a first port 810, a second port 820, and a third port 830 illustrated in FIG. 24; the PCIe switch 80 makes use of two ports (the first port 810 and the second port 820) for the cable relay between the master device and the target device. In the first port 810 on the side of the master device and in the second port 820 on the side of the target device, the PCIe circuit explained with reference to FIG. 18 is designed. The first port 810 and the second port 820 are connected via a port arbitration circuit 840. The first port 810 includes a reception buffer 811, a transmission buffer 812, and a retransmission buffer 813; while the second port 820 includes a reception buffer 821, a transmission buffer 822, and a retransmission buffer 823. Each of those buffers is an eight-step buffer. Herein, by inserting a switch device including large-sized buffers in the transmission path, there are times when it is possible to absorb the increase in the response delay occurring in the cable.

However, in a conventional apparatus performing the high-speed serial transmission using a cable, the abovementioned measure is nothing more than inserting a temporary buffer in the device or on the transmission path. The manufacturing of a device with a changed buffer size is an expensive task. Moreover, if the addressee device to be connected includes only small buffers, then the increased buffer size produces no effect. Besides, every time the length of the connected cable changes, it becomes necessary to change the buffer size, which involves some efforts.

In the serial transmission technology such as the PCIe technology in which it is allowed to transmit a plurality of packets without waiting for an ACK response, the data transfer efficiency cannot be enhanced just by shortening the ACK response time with the use of a connection adaptor for inserting a temporary buffer in the transmission path. In the technology of inserting a PCIe switch device that includes large-sized internal buffers, if balance is not maintained between the delay time occurring at the data transmission source device, the delay time occurring in the transmission path of the data transmission addressee device, and the sizes of the buffers on the transmission side and the reception side of the switch device; then the data transfer efficiency decreases. Besides, as the cable becomes longer, the data transfer rate decreases even if a free space is available in the internal buffers.

SUMMARY OF THE INVENTION

It is an object of the present invention to at least partially solve the problems in the conventional technology.

According to an aspect of the present invention, there is provided a data transfer apparatus including: a first port and a second port that communicate data; a memory unit that stores the data; and a securing unit that secures, when a first time period starting from transmission of data up to reception of a response to transmitted data at the first port is longer than a second time period starting from transmission of data up to reception of a response to transmitted data at the second port, a first memory space that is used in data transfer in the first port so as for the first memory space to have a larger size than a size of a second memory space used in data transfer in the second port.

According to another aspect of the present invention, there is provided a data transfer device including: a first port and a second port that communicate data; a memory unit that stores the data; and a securing unit that secures, when a first time period starting from transmission of data up to reception of a response to transmitted data at the first port is longer than a second time period starting from transmission of data up to reception of a response to transmitted data at the second port, a first memory space that is used in data transfer in the first port so as for the first memory space to have a larger size than a size of a second memory space used in data transfer in the second port.

According to still another aspect of the present invention, there is provided a data transfer method in a data transfer device that includes a first port, a second port, and a securing unit including: transmitting data by the first port; transmitting data by the second port; and securing, by the securing unit, when a first time period starting from transmission of data up to reception of a response to transmitted data at the first port is longer than a second time period starting from transmission of data up to reception of a response to transmitted data at the second port, a first memory space that is used in data transfer in the first port so as for the first memory size to have a larger size than a size of a second memory space used in data transfer in the second port.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 5 is a flowchart for explaining an example of the operations performed when a first reception buffer in the data relay apparatus according to the first embodiment receives a packet;

FIG. 6 is a flowchart for explaining an example of the operations performed when a transmitting unit in the first reception buffer according to the first embodiment transmits a packet;

FIG. 7 is a flowchart for explaining an example of the operations performed for updating a memory map;

FIG. 8 is a graph of an exemplary relation between the buffer size and the data transfer rate of a transmission buffer in a master device;

FIG. 9 is a graph of an exemplary relation of the cable length with the data transfer rate between the master device and a target device;

FIG. 12 is a schematic diagram of an example of the application of the data relay apparatus according to the first embodiment;

FIG. 14 is a schematic diagram of an example of the application of the data relay apparatus according to the first embodiment;

FIG. 17 is a schematic diagram of an example of the application of the PCIe switch according to the second embodiment;

FIG. 18 is a schematic diagram of an exemplary internal configuration of a common master device and a common target device employed in the PCIe technology;

FIG. 28 is a schematic diagram of an exemplary data configuration of a base ID field provided in the register map illustrated in FIG. 27.

DETAILED DESCRIPTION OF THE PREFERRED EMBODIMENTS

Exemplary embodiments of an apparatus, device, and method for data transfer according to the present invention are described in detail below with reference to the accompanying drawings. The present invention is not limited to these exemplary embodiments.

First Embodiment

Figure 1:
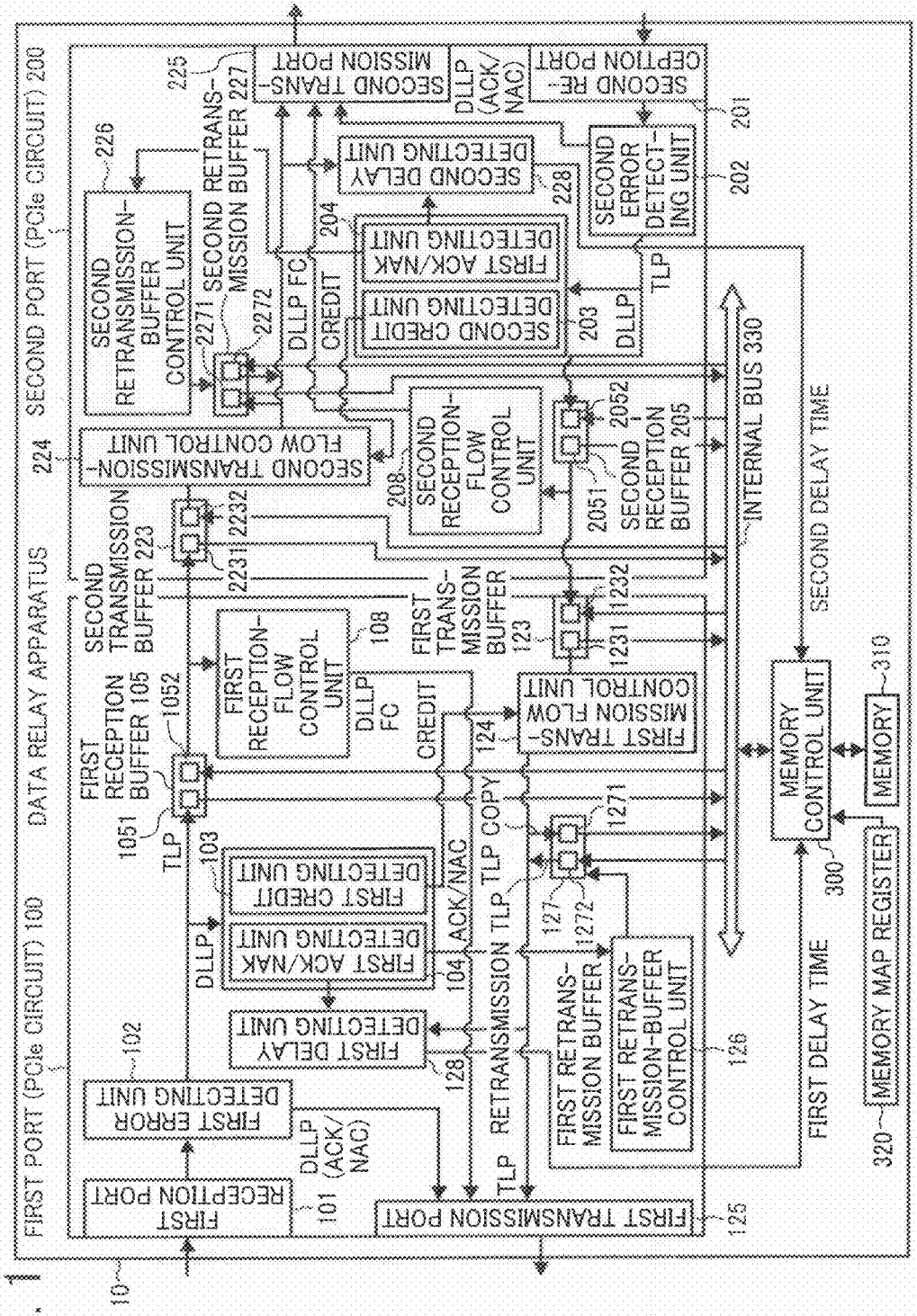
FIG. 1 is a block diagram of an exemplary configuration of a data relay apparatus according to a first embodiment of the present invention.

FIG. 1 is a block diagram of an exemplary configuration of a data relay apparatus 10 according to a first embodiment of the present invention. The data relay apparatus 10 is a data transfer apparatus for transferring packet data. While performing data transfer, for example, the peripheral component interconnect express (PCIe) standard is employed and packet data including transaction layer packets (TLPs) and data link layer packets (DLLPs) such as acknowledgement (ACK) packets, negative acknowledgement (NAK) packets, and flow control (FC) packets is transferred. The TLPs are packets for holding requests or data and the DLLPs are packets transferred for the control purpose.

The data relay apparatus 10 includes a first port 100, a second port 200, a memory control unit 300, and a memory map register 320. The first port 100, the second port 200, and the memory control unit 300 are interconnected with an internal bus 330. Each of the first port 100 and the second port 200 is a PCIe circuit. Thus, the data relay apparatus 10 includes two PCIe circuits.

The internal bus 330 is used in the communication of packet data between the first port 100 and the memory control unit 300 as well as used in the communication of packet data between the second port 200 and the memory control unit 300. The memory control unit controls a memory 310. More particularly, the memory control unit 300 reads packet data from the memory 310 and transmits the packet data over the internal bus 330. Besides, the memory control unit 300 receives packet data from the first port 100 and the second port 200 via the internal bus 330 and stores the packet data in the memory 310. The memory 310 functions as a reception buffer, a transmission buffer, and a retransmission buffer of the first port 100 and of the second port 200 for storing the packet data. Each of those buffers is a buffer compliant to the PCIe standard. The memory map register 320 stores therein a memory map of the memory 310.

The first port 100 includes a first reception port (RX) 101, a first error detecting unit 102, a first credit detecting unit 103, a first ACK/NAK detecting unit 104, a first reception buffer 105, a first reception-flow control unit 108, a first transmission buffer 123, a first transmission-flow control unit 124, a first transmission port (TX) 125, a first retransmission-buffer control unit 126, a first retransmission buffer 127, and a first delay detecting unit 128. The second port 200 includes a second reception port (RX) 201, a second error detecting unit 202, a second credit detecting unit 203, a second ACK/NAK detecting unit 204, a second reception buffer 205, a second reception-flow control unit 208, a second transmission buffer 223, a second transmission-buffer control unit 224, a second transmission port (TX) 225, a second retransmission-buffer control unit 226, and a second retransmission buffer 227.

The first reception buffer 105 includes a receiving unit 1051 and a transmitting unit 1052, and stores therein a buffer ID that is useful in identifying the first reception buffer 105. Upon receiving packet data, the first reception buffer 105 transmits a memory write signal to the internal bus 330. The memory write signal represents the information instructing the writing of a packet in the memory 310 and includes the received packet and the buffer ID of the first reception buffer 105.

At the time of transmitting a packet over the subsequent transmission path, the transmitting unit 1052 transmits a memory read signal over the internal bus 330. The memory read signal includes the buffer ID of the first reception buffer 105. As a response to the memory read signal, the transmitting unit 1052 receives from the internal bus 330 a TLP along with the buffer ID of the first reception buffer 105. Then, the transmitting unit 1052 transmits the received TLP to the second port 200.

In this way, the first reception buffer 105 according to the present embodiment does not include a first in first out (FIFO) memory but makes use of the memory 310, which is connected thereto via the internal bus 330, as the buffer. Thus, the first reception buffer 105 stores the packet data to be transferred in the memory 310 on a temporary basis.

In an identical manner to the first reception buffer; each of the first transmission buffer 123, the first retransmission-buffer control unit 126, the second reception buffer 205, the second transmission buffer 223, and the second retransmission-buffer control unit 226 includes a transmitting unit and a receiving unit. Besides, each of the first transmission buffer 123, the first retransmission-buffer control unit 126, the second reception buffer 205, the second transmission buffer 223, and the second retransmission-buffer control unit 226 stores therein a buffer ID that is useful in identifying the corresponding buffer. Meanwhile, the configurations and the operations of the transmitting unit and the receiving unit in each of these buffers are identical to the configurations and the operations of the receiving unit 1051 and the transmitting unit 1052, respectively.

The first delay detecting unit 128 in the first port 100 measures a first delay time that represents the time taken from the transmission of a TLP from the first reception port 101 up to the reception of a DLLP such as an ACK packet, an NAK packet, or an FC packet as the response to the transmitted TLP by the first transmission buffer 123. The first delay detecting unit 128 then transmits the first delay time to the memory control unit 300. In an identical manner, a second delay detecting unit 228 in the second port 200 measures a second delay time that represents the time taken from the transmission of a TLP from the second reception port 201 up to the reception of a DLLP as the response to the transmitted TLP by the second transmission buffer 223. The second delay detecting unit 228 then transmits the second delay time to the memory control unit 300.

Given below is the explanation of the constituent elements other than the abovementioned constituent elements. The first reception port 101 receives TLPs and DLLPs. The first error detecting unit 102 detects errors in a TLP on the basis of a cyclic redundancy check (CRC) value. If no error is detected, then the first error detecting unit 102 transmits an ACK packet to the first transmission port 125. On the other hand, if an error is detected, then the first error detecting unit 102 transmits an NAK packet to the first transmission port 125 and revokes the received TLP. When no error is detected, the TLP is transmitted to the first reception buffer 105.

The first transmission-flow control unit 124 determines whether a free space is available in the reception buffer of the device connected on the side of the first port 100. Only when a free space is available in the reception buffer of that device, the first transmission port (TX) 125 transmits the TLP.

The free space in the reception buffer of the device on the side of the first port 100 is managed based on credit information reported by that device in an FC packet. The first reception port (RX) 101 receives that FC packet. The first credit detecting unit 103 then detects a credit value from the FC packet and reports the credit value to the first transmission-flow control unit 124.

The first ACK/NAK detecting unit 104 unit detects whether the received packet is an ACK packet or an NAK packet and reports the information regarding the same to the first retransmission-buffer control unit 126.

If an ACK packet is reported to have been received, then the first retransmission-buffer control unit 126 destroys the contents of the TLP stored in the first retransmission buffer 127 under the assumption that the TLP has reached the addressee device in the normal condition. On the other hand, if an NAK packet is reported to have been received, then the first retransmission-buffer control unit 126 retransmits the TLP stored in the first retransmission buffer 127 under the assumption that the TLP did not reach the addressee device in the normal condition.

The completion of the transfer of the packet data from the first reception buffer 105 leads to the creation of a free space in the first reception buffer 105. Then, the first reception-flow control unit 108 transmits, to the first transmission port 125, an FC packet including the size of that free space as the credit information.

Figure 2:
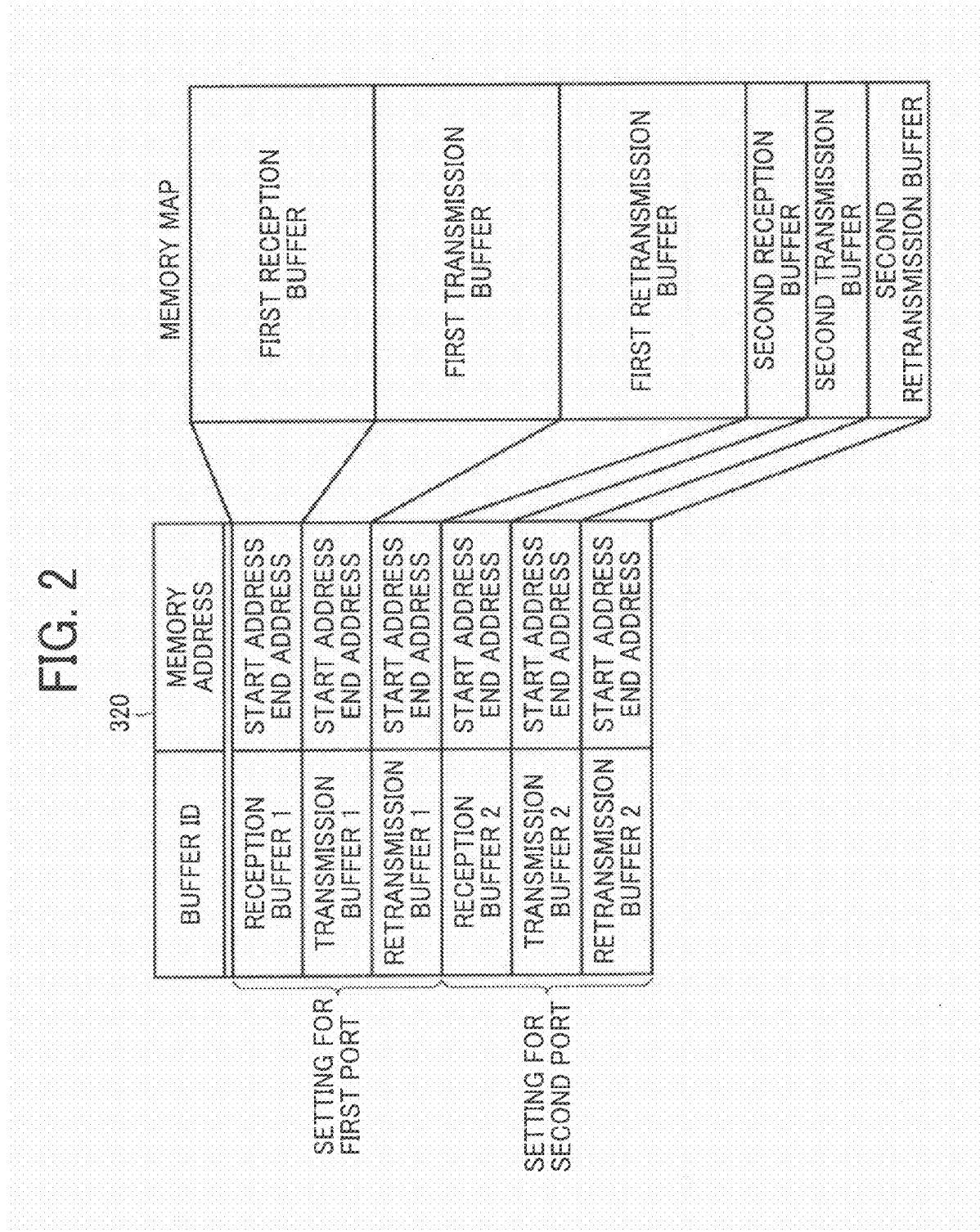
FIG. 2 is a schematic diagram of an exemplary data configuration of a memory map register in the data relay apparatus according to the first embodiment.

FIG. 2 is a schematic diagram of an exemplary data configuration of the memory map register 320. In the memory map register 320, the buffer ID of each buffer is stored in a corresponding manner with the start address and the end address of that buffer in the memory 310. Those values are reflected in a memory map and are referred to by the memory control unit 300 at the time of accessing the memory 310 as described later. Meanwhile, the values in the memory map stored in the memory map register 320 are default values.

The memory map data illustrated in FIG. 2 represents the data in the case of connecting a cable on the side of the first port 100 and directly connecting a device on the side of the second port 200 in the data relay apparatus 10. In that case, the first port 100 has a longer transfer delay time as compared to the second port 200. For that reason, as illustrated in FIG. 2, a larger buffer space is allocated to the buffers of the first port 100 than the buffer space allocated to the buffers of the second port 200. That makes it possible to absorb the delay time of the first port 100. Besides, since the buffer size of the first retransmission-buffer control unit 126 is dependent on the buffer size of the first transmission port 125, a buffer space equal to or larger than the buffer space of the first transmission port 125 is allocated to the first retransmission-buffer control unit 126. The same applies to the second retransmission-buffer control unit 226.

Figure 3:
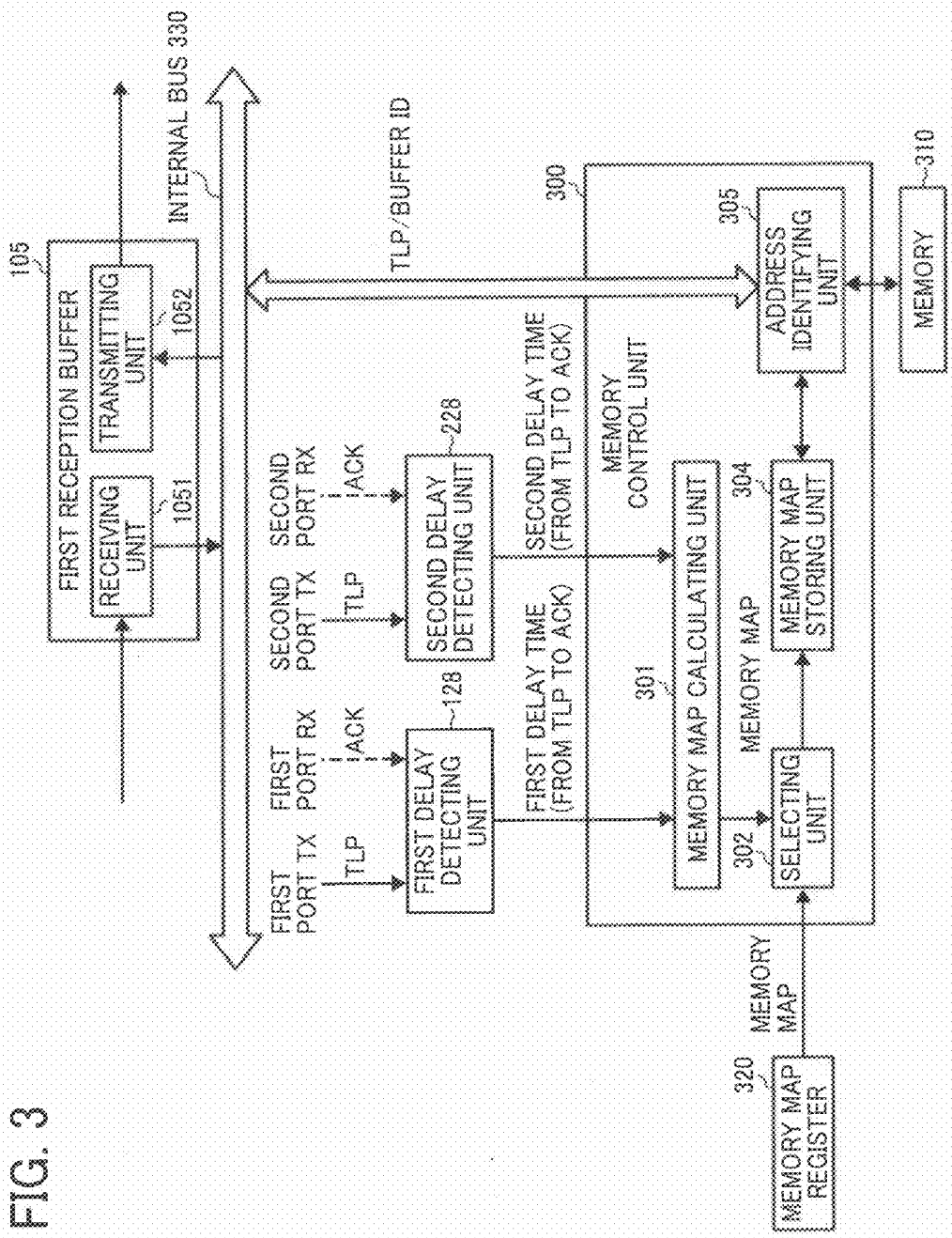
FIG. 3 is a schematic diagram of an exemplary configuration of a memory control unit in the data relay apparatus according to the first embodiment.

FIG. 3 is a schematic diagram of an exemplary configuration of the memory control unit 300, which includes a memory map calculating circuit 301, a selecting unit 302, a memory map storing unit 304, and an address identifying unit 305.

Figure 4:
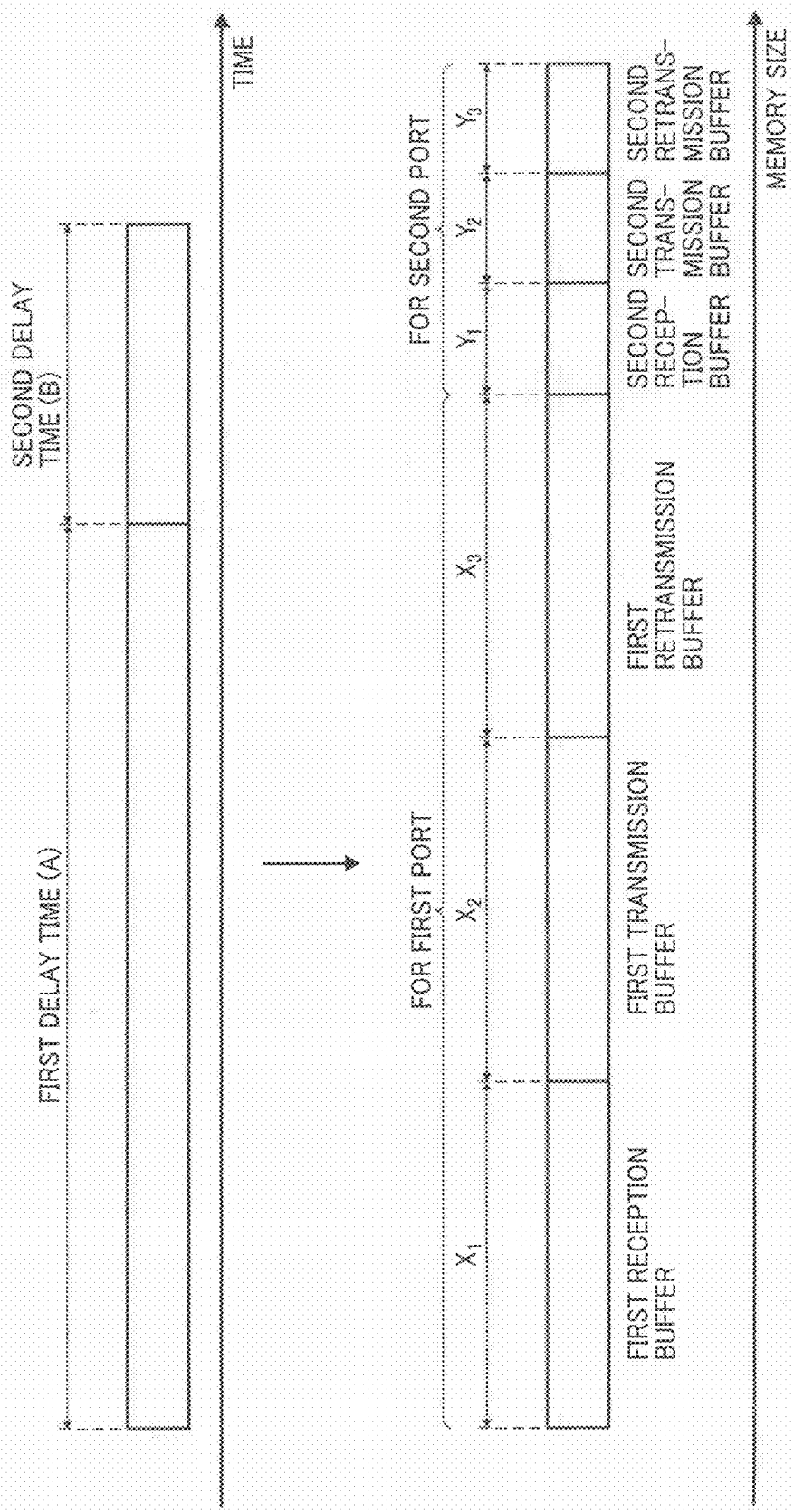
FIG. 4 is a schematic diagram for explaining the operations performed by a memory map calculating circuit in the memory control unit according to the first embodiment.

The memory map calculating circuit 301 receives the first delay time from the first delay detecting unit 128, receives the second delay time from the second delay detecting unit 228, and calculates a memory map of the memory 310 based on the first delay time and the second delay time. That is, based on the first delay time and the second delay time, the memory map calculating circuit 301 secures the buffer space for each port. More particularly, for a longer delay time, the memory map calculating circuit 301 secures a larger buffer space for the corresponding port; and for a shorter delay time, the memory map calculating circuit 301 secures a smaller buffer space for the corresponding port. FIG. 4 is a schematic diagram for explaining the operations performed by the memory map calculating circuit 301.

The memory map calculating circuit 301 creates a memory map in such a way that the ratio of the first delay time and the second delay time is identical to the ratio of the respective buffer sizes. As illustrated in FIG. 4, for a first delay time A; a second delay time B; buffer sizes $X_1$, $X_2$, and $X_3$ of the first reception buffer 105, the first transmission buffer 123, and the first retransmission buffer 127, respectively, in the first port 100; and buffer sizes $Y_1$, $Y_2$, and $Y_3$ of the second reception buffer 205, the second transmission buffer 223, and the second retransmission buffer 227, respectively, in the second port 200; the memory map calculating circuit 301 calculates a memory map in such a way that the buffer space allocation enables establishment of (Equation 1) given below.

$$A:B=X_1:Y_1=X_2:Y_2=X_3:Y_3 \qquad \text{(Equation 1)}$$

A specific calculation example is explained below. Herein, it is assumed that the memory has the total size of eight kilobytes (8192 bytes). Moreover, it is assumed that the first port 100 is directly connected to a PCIe device via a PCIe slot, while the second port 200 is connected to a PCIe device via a cable. Furthermore, it is assumed that the time taken for packet transmission depends on the cable length and that a delay of five nanoseconds occurs for every meter of the cable length.

In the calculation, it is assumed that the first port 100 and the second port 200 are connected by the PCIe x4 lane connection. Herein, for example, if packets of 128 bytes are transferred bi-directionally, it takes at least 152 nanoseconds (the time taken for transmitting the header size worth 24 bytes+the total of the time taken for transmitting the data (payload) worth 128 bytes) to complete the transmission of a single packet with the PCIe x4 lane connection. If, in the transmission destination device, no error has occurred at the time of completing the reception of a packet; an ACK packet is transmitted as the response. From the completion of the reception of a packet up to the transmission of an ACK packet, a delay time occurs inside that PCIe device. In the calculation example, it is assumed that a delay time of 300 nanoseconds occurs inside the PCIe device and that the cable connected to the second port 200 is 100 meters long.

The first delay time A occurring in the first port 100 is at least 452 nanoseconds as obtained by adding 152 nanoseconds taken for packet transmission to 300 nanoseconds of the PCIe internal delay. In comparison, the second delay time B occurring in the second port 200 is 1452 nanoseconds as obtained in the following manner: (152 nanoseconds+500 nanoseconds (5 nanoseconds×100 meters) of the cable delay+300 nanoseconds of the PCIe internal delay+500 nanoseconds (5 nanoseconds×100 meters). From the ratio of those delay times, the first port 100 has the memory size of 1945 bytes (=8192 bytes×452 nanoseconds/(1452 nanoseconds+ 452 nanoseconds)); while the second port 200 has the memory size of 6247 bytes (=8192 bytes×1452 nanoseconds/ (1452 nanoseconds+452 nanoseconds)).

Hence, for the first delay time A; the second delay time B; the buffer sizes $X_1$, $X_2$, and $X_3$ of the first reception buffer 105, the first transmission buffer 123, and the first retransmission buffer 127, respectively, in the first port 100; and the buffer sizes $Y_1$, $Y_2$, and $Y_3$ of the second reception buffer 205, the second transmission buffer 223, and the second retransmission buffer 227, respectively, in the second port 200; the memory map calculating circuit 301 determines $X_1$ and $Y_1$ in the following manner so that the buffer space allocation in the created memory map enables establishment of $A:B=X_1:Y_1=X_2:Y_2=X_3:Y_3$.

$$X_1=X_2=X_3=1945 \text{ bytes}/3=684 \text{ bytes}$$

$$Y_1=Y_2=Y_3=6247 \text{ bytes}/3=2082 \text{ bytes}$$

At that time, in each of the first reception buffer 105, the first transmission buffer 123, and the first retransmission buffer 127 in the first port 100; 5 packets (=684 bytes/128 bytes) of 128 bytes each can be stored so that the wait time for ACK packets or FC packets occurring due to the direct connection to the PCIe slot can be eliminated with small-sized buffers. In contrast, in each of the second reception buffer 205, the second transmission buffer 223, and the second retransmission buffer 227 in the second port 200; 16 packets (=2082 bytes/128 bytes) of 128 bytes each can be stored so that the wait time for ACK packets or FC packets occurring due to the cable can be eliminated with large-sized buffers.

In this way, depending on the delay time of each port, a buffer space can be allocated to that port. Thus, for a port having a relatively shorter delay time, the buffer size can be reduced; while for a port having a relatively longer delay time, the buffer size can be increased. That makes it possible to allocate a suitable size of buffer to each port thereby enabling achieving shortening of the delay time attributed to insufficient buffer quantity.

The selecting unit 302 either selects the memory map stored in the memory map register 320 or selects the memory map created by the memory map calculating circuit 301 and stores the selected memory map in the memory map storing unit 304. More particularly, if no memory map is created by the memory map calculating circuit 301, then the selecting unit 302 selects the memory map stored in the memory map register 320. Once the memory map calculating circuit 301 creates a memory map, the selecting unit 302 selects the memory map created by the memory map calculating circuit 301.

The address identifying unit 305 receives a memory write signal from the receiving unit 1051 of the first reception buffer 105 via the internal bus 330. Upon receiving the memory write signal, the address identifying unit 305 refers to the memory map stored in the memory map storing unit 304 and, by making use of the buffer ID included in the memory write signal, stores the TLP at the address allocated to the first reception buffer 105. Moreover, the address identifying unit 305 receives a memory read signal from the transmitting unit 1052 of the first reception buffer 105 via the internal bus 330. Upon receiving the memory read signal, the address identifying unit 305 identifies the address allocated to the first reception buffer 105 in an identical manner to the case of receiving a memory write signal. Then, the address identifying unit 305 reads the TLP from the identified address. In this way, the address identifying unit 305 manages the communication of TLPs between the first reception buffer 105 and the memory 310.

Similarly, the address identifying unit 305 manages the communication of TLPs between the memory 310 and each of the first transmission buffer 123, the first retransmission buffer 127, the second reception buffer 205, the second transmission buffer 223, and the second retransmission buffer 227.

FIG. 5 is a flowchart for explaining an example of the operations performed when the first reception buffer 105 receives a packet. Upon receiving packet data (TLP), the receiving unit 1051 of the first reception buffer 105 transmits a memory write signal to the memory control unit 300 via the internal bus (Step S100). The memory write signal includes the TLP received by the receiving unit 1051 and the buffer ID of the first reception buffer 105.

Subsequently, the address identifying unit 305 of the memory control unit 300 refers to the memory map storing unit 304 and, by making use of the buffer ID included in the memory write signal, identifies that address in the memory 310 which is allocated to the first reception buffer 105 (Step S102). Then, the address identifying unit 305 performs a memory write operation at the identified address (Step S104). This concludes the operations regarding packet data reception performed by the first reception buffer 105.

By performing the abovementioned operations, it becomes possible to write the TLP included in the memory write signal into that buffer space of the memory 310 which is allocated to the first reception buffer 105. In this way, the first reception buffer 105 is able to make use of the memory 310 as a buffer.

FIG. 6 is a flowchart for explaining an example of the operations performed when the transmitting unit 1052 transmits a packet. At the time of transmitting packet data (TLP), the transmitting unit 1052 transmits a memory read signal to the memory control unit 300 via the internal bus 330 (Step S200). The memory read signal includes the buffer ID of the first reception buffer 105. Subsequently, the address identifying unit 305 of the memory control unit 300 refers to the memory map storing unit 304 and, by making use of the buffer ID of the first reception buffer 105 included in the memory read signal, identifies that address in the memory 310 which is allocated to the first reception buffer 105 (Step S202). Then, the address identifying unit 305 performs a memory read access with respect to the identified address and reads the TLP written in that buffer space of the memory 310 which is allocated to the first reception buffer 105 (Steps S204 and S206).

The address identifying unit 305 of the memory control unit 300 then transmits the TLP read from the memory 310 and the buffer ID of the first reception buffer 105 to the internal bus 330 (Step S208). On the basis of the received buffer ID, the internal bus 330 identifies the first reception buffer 105 and transmits the TLP received from the memory control unit 300 to the transmitting unit 1052 of the identified first reception buffer 105 (Step S210). Upon receiving the TLP from the internal bus 330, the transmitting unit 1052 transmits the same to the transfer destination (Step S212). This concludes the operations regarding packet data transmission performed by the first reception buffer 105.

As described above, although the first reception buffer 105 includes no internal memory, it can still temporarily hold the packet data by making use of the memory 310 as a buffer in an identical manner to the conventional reception buffer and then transmit the packet data to the transfer destination at a suitable timing.

FIG. 7 is a flowchart for explaining an example of the operations performed for updating the memory map. Prior to the start of packet communication, the selecting unit 302 selects the memory map stored in the memory map register 320 and stores the same in the memory map storing unit 304 (Step S300). Once the packet communication starts, the first port 100 or the second port 200 receives packet data (TLP). If the first port 100 receives the packet data (TLP) (first port at Step S302), the packet data (TLP) is transmitted from the first port 100 to the second port 200 and then transmitted from the second port 200 to the addressee device (Step S304). Subsequently, the second port 200 receives packet data (ACK, NAK, or FC) as a response to the transmitted packet data (TLP). Upon receiving the packet data as a response, the second delay detecting unit 228 measures the second delay time that represents the time taken from the transmission of the packet data (TLP) up to the reception of the packet data (ACK, NAK, or FC) as a response to the transmitted TLP (Step S306).

Meanwhile, if the second port 200 receives the packet data (TLP) (second port at Step S302), the packet data (TLP) is transmitted from the first port 100 (Step S314). Subsequently, the first port 100 receives packet data (ACK, NAK, or FC) as a response to the transmitted packet data (TLP). Upon receiving the packet data as a response, the first delay detecting unit 128 measures the first delay time that represents the time taken from the transmission of the packet data (TLP) up to the reception of the packet data (ACK, NAK, or FC) as a response to the transmitted TLP (Step S316).

Upon measuring or updating both the first delay time and the second delay time (Yes at Step S320), the memory map calculating circuit 301 creates a memory map of the memory 310 on the basis of the updated first delay time and the updated second delay time (Step S322). Subsequently, the selecting unit 302 stores the created memory map in the memory map storing unit 304. That is, the selecting unit 302 overwrites the memory map that already exists in the memory map storing unit 304 with the newly-created memory map so that the memory map in the memory map storing unit 304 gets updated (Step S324). The system control then returns to Step S302. Meanwhile, if the updating operation is yet to finish (No at Step S320), then the system control returns to Step S302. This concludes the operations performed for updating the memory map.

In this way, since the memory map is timely updated, the buffer space in the memory 310 can be retained according to an appropriate buffer size allocation that is determined on the basis of the first delay time and the second delay time.

Figure 21:
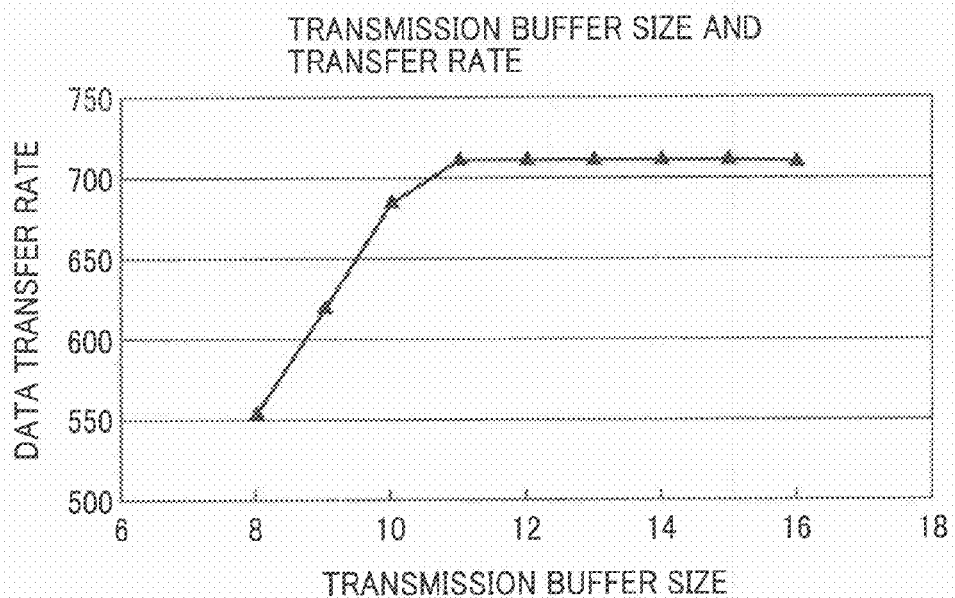
FIG. 21 is a graph of an example of the relation between the transmission buffer size and the data transfer rate of the master device and the target device.

FIG. 8 is a graph of an exemplary relation between the buffer size and the data transfer rate of the transmission buffer in the master device. The solid line represents the data transfer rate in the case of using the data relay apparatus 10 according to the present embodiment. Identical to FIG. 21, the vertical axis represents the data transfer rate at the time when memory read requests of 128 bytes per request are continuously issued by a PCIe x4 lane connection. The dotted line represents the data transfer rate when the data relay apparatus 10 is not used. As illustrated in the graph in FIG. 8, in the case of using the data relay apparatus 10, the data transfer rate is not seen to decrease even if the transmission buffer in the master device has a small buffer size. That is because, by inserting the data relay apparatus 10, the small-sized buffers enable eliminating the wait time for ACK packets or FC packets occurring in the port on the side of the directly-connected PCIe slot and the large-sized buffers enable eliminating the wait time for ACK packets or FC packets occurring in the port on the side of the cable. Hence, if the master device has a small buffer size, using the data relay apparatus 10 makes it possible to maintain a high data transfer rate.

Figure 22:
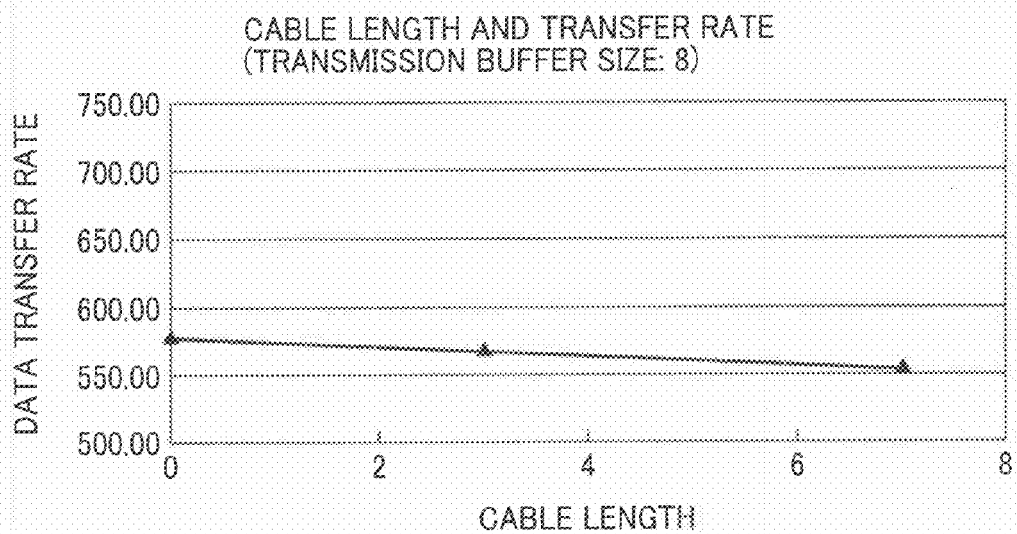
FIG. 22 is a graph of an example of the relation between the cable length and the data transfer rate.
Figure 23:
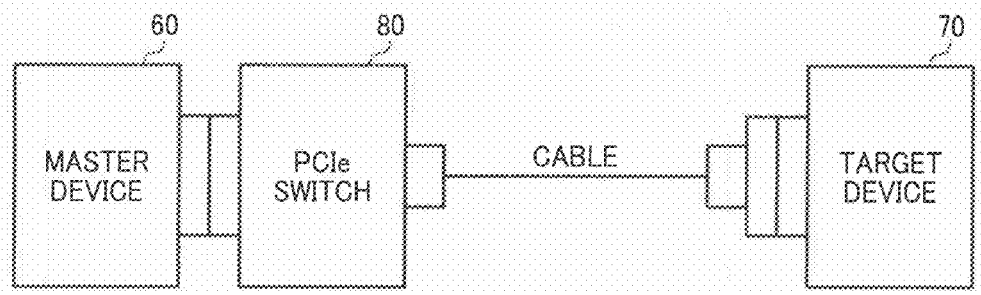
FIG. 23 is a schematic diagram of an example of the conventional technology according to which a PCIe switch is inserted in the transmission path.
Figure 24B:
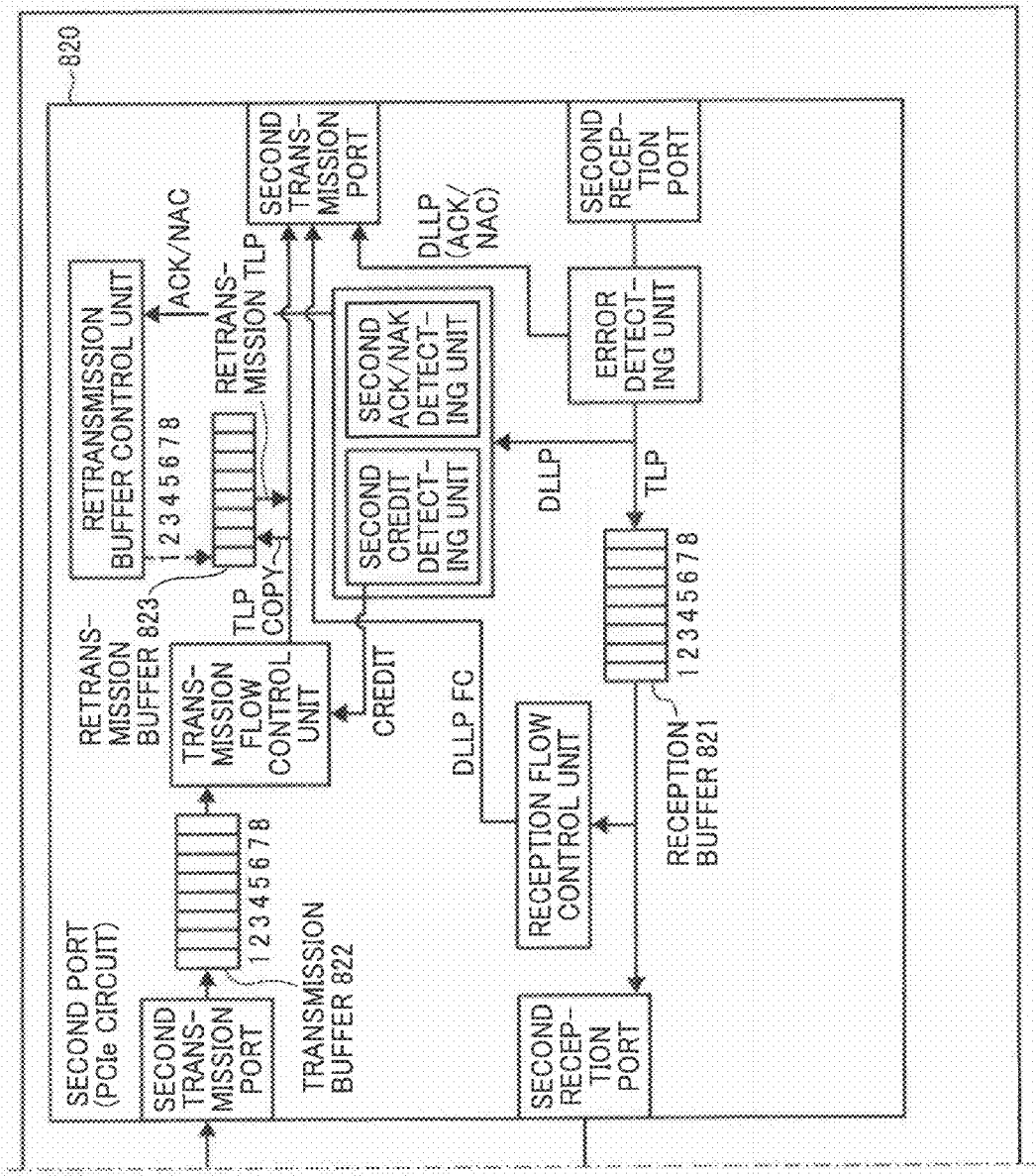
FIG. 24 is a schematic diagram of an exemplary internal configuration of a common PCIe switch in the conventional technology.

FIG. 9 is a graph of an exemplary relation of the cable length with the data transfer rate between the master device and the target device. Identical to FIG. 22, the vertical axis represents the data transfer rate at the time when memory read requests of 128 bytes per request are continuously issued by a PCIe x4 lane connection. The solid line represents the data transfer rate in the case of using the data relay apparatus 10, while the dotted line represents the data transfer rate when the data relay apparatus 10 is not used. As illustrated in the graph in FIG. 9, in the case of using the data relay apparatus 10, it is possible to maintain a constant data transfer rate irrespective of the cable length. That is, irrespective of the cable length, using the data relay apparatus 10 makes it possible to maintain a high data transfer rate.

Explained below is an example of the application of the data relay apparatus 10 according to the present embodiment. In a system illustrated in FIG. 10, a master device 20 is connected to a target device 30 by a cable 40. Herein, it is assumed that the master device 20 and the target device 30 have a small buffer size so that the delay caused by the cable 40 cannot be absorbed. In that case, as illustrated in FIG. 10, a data relay apparatus 10A according to the present embodiment is inserted in between the cable 40 and the master device 20 and a data relay apparatus 10B according to the present embodiment is inserted in between the cable 40 and the target device 30.

Once the packet communication starts, the data relay apparatus 10A allocates a larger buffer size to the port on the side of the cable at which the packet transfer encounters a long delay time. In the example illustrated in FIG. 10, it is assumed that the delay time between the cable 40 and the data relay apparatus 10A is double the delay time between the master device 20 and the data relay apparatus 10A. In that case, a 4-step buffer is allocated to a first reception buffer 105A on the side of the master device 20; while an 8-step buffer, which is double the size of the 4-step buffer allocated to the first reception buffer 105A on the side of the master device 20, is allocated to a second transmission buffer 223A and to a second retransmission buffer 227A on the side of the cable 40. Regarding the data relay apparatus 10B, an identical buffer allocation is performed. That is, an 8-step buffer is allocated to a first reception buffer 105B; while a 4-step buffer is allocated to a second transmission buffer 223B and to a second retransmission buffer 227B.

Figure 10:
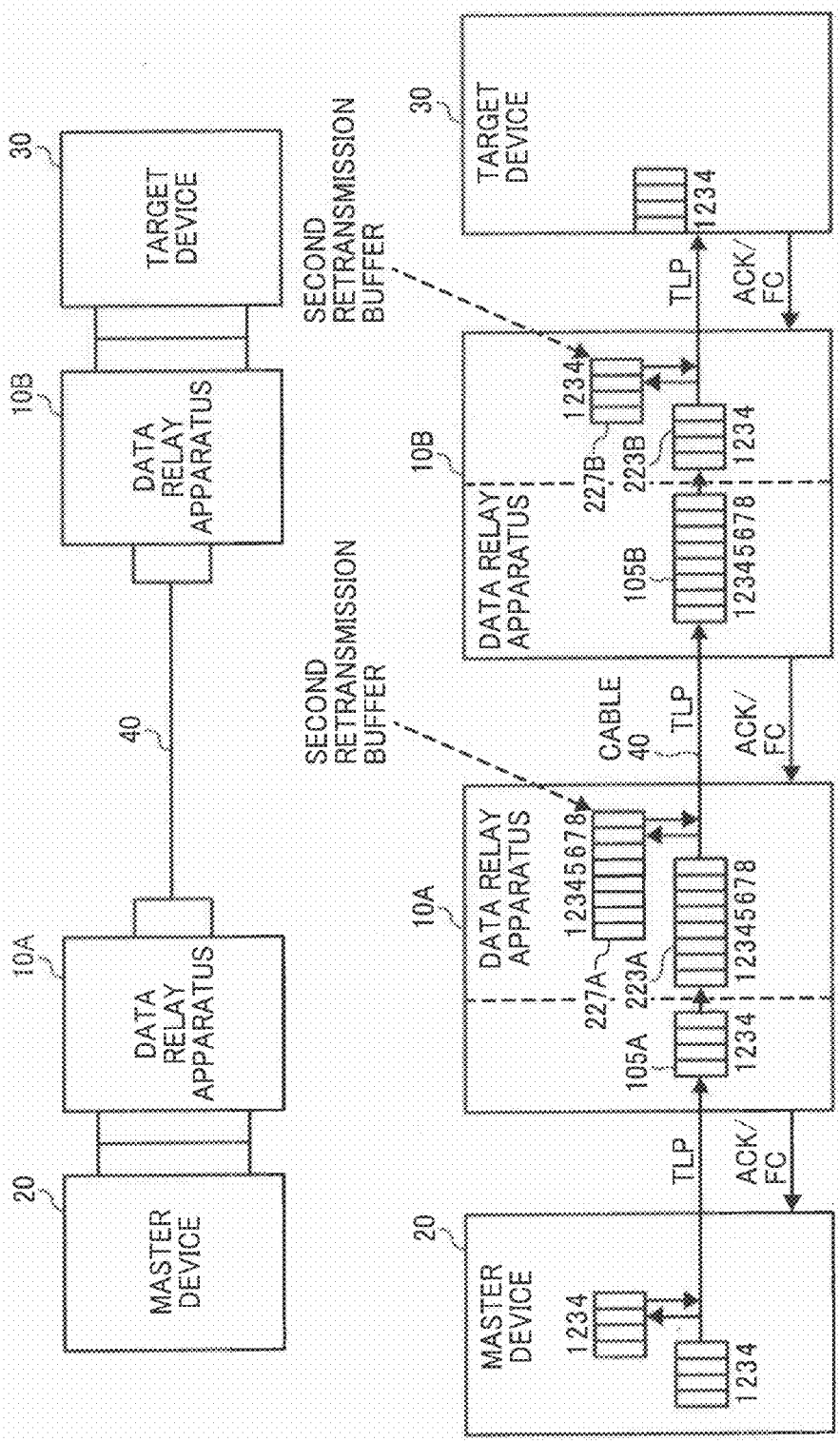
FIG. 10 is a schematic diagram of an example of the application of the data relay apparatus according to the first embodiment.
Figure 11A:
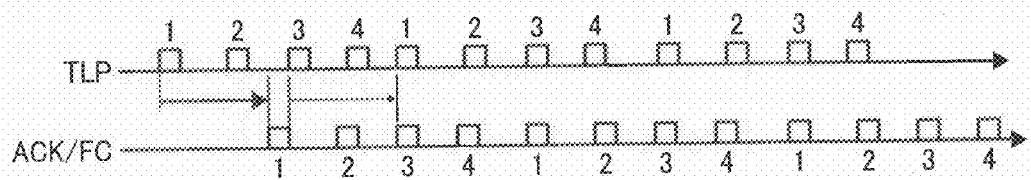
FIG. 11A is an exemplary timing diagram of the packet transfer between the master device and the data relay apparatus according to the first embodiment.
Figure 11B:
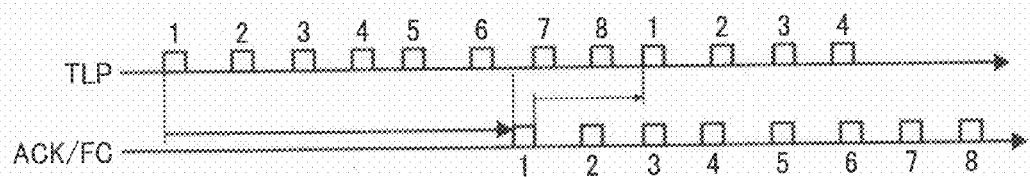
FIG. 11B is an exemplary timing diagram of the packet transfer between two data relay apparatuses according to the first embodiment.
Figure 11C:
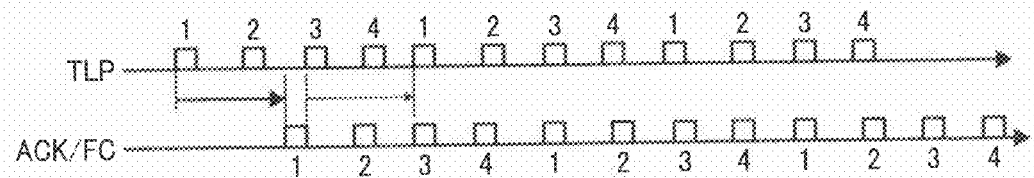
FIG. 11C is an exemplary timing diagram of the packet transfer between the data relay apparatus according to the first embodiment and the target device.

FIGS. 11A to 11C are exemplary timing diagrams of the packet transfer performed in the system illustrated in FIG. 10. FIG. 11A is an exemplary timing diagram of the packet transfer between the master device 20 and the data relay apparatus 10A. FIG. 11B is an exemplary timing diagram of the packet transfer between the data relay apparatus 10A and the data relay apparatus 10B. FIG. 11C is an exemplary timing diagram of the packet transfer between the data relay apparatus 10B and the target device 30.

The master device 20 is directly connected to the data relay apparatus 10A without laying a cable therebetween and the target device 30 is directly connected to the data relay apparatus 10B without laying a cable therebetween. Hence, as illustrated in FIGS. 11A to 11C, not much delay occurs. Thus, a 4-step buffer is sufficient to perform the data transfer without reducing the data transfer efficiency. However, since the cable 40 is laid to connect the data relay apparatus 10A to the data relay apparatus 10B, the delay time is longer as illustrated in FIG. 11B and as compared to the delay time between the data relay apparatus 10A and the master device 20 or the delay time between the data relay apparatus 10B and the target device 30. Regarding that issue, an 8-step buffer is allocated on the side of the cable 40 with respect to the data relay apparatus 10A according to the present embodiment and an 8-step buffer is allocated on the side of the cable 40 with respect to the data relay apparatus 10B according to the present embodiment. That makes it possible to continue efficient data transfer without interruption.

In a system illustrated in FIG. 12, the master device 20 includes an 8-step buffer and the target device 30 includes a 4-step buffer. The cable 40 is laid to connect the master device 20 to the target device 30. In this case, as illustrated in FIG. 12, the data relay apparatus 10 according to the present embodiment is inserted in between the target device 30 and the cable 40.

Figure 13A:
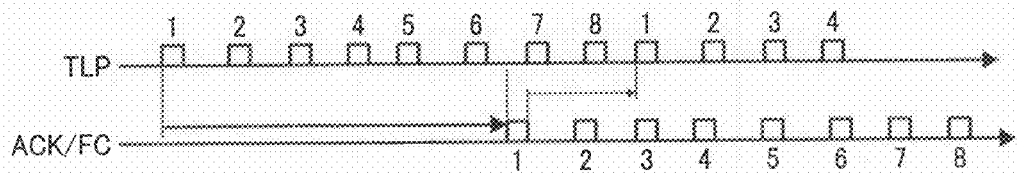
FIG. 13A is an exemplary timing diagram of the packet transfer between the master device and the data relay apparatus according to the first embodiment.
Figure 13B:
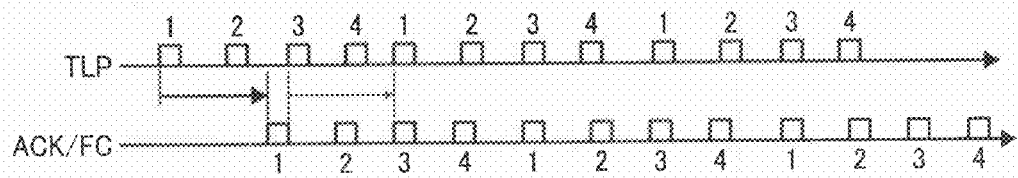
FIG. 13B is an exemplary timing diagram of the packet transfer between the data relay apparatus according to the first embodiment and the target device.

Once the packet communication starts, the data relay apparatus 10 allocates an 8-step buffer on the side of the cable 40 and allocates a 4-step buffer on the side of the target device 30. That is, the data relay apparatus 10 allocates a 4-step buffer into the first reception buffer 105 and allocates an 8-step buffer into the second transmission buffer 223 and into the second retransmission buffer 227. FIG. 13A is an exemplary timing diagram of the packet transfer between the master device 20 and the data relay apparatus 10. FIG. 13B is an exemplary timing diagram of the packet transfer between the data relay apparatus 10 and the target device 30. The delay time in the packet transfer between the master device 20 and the data relay apparatus 10 is longer than the delay time between the data relay apparatus 10 and the target device 30. However, since an 8-step buffer is allocated on the side of the cable 40 with respect to the data relay apparatus 10 according to the present embodiment, it is possible to continue efficient data transfer without interruption.

In a system illustrated in FIG. 14, the master device 20 includes a 4-step buffer and the target device 30 includes an 8-step buffer in contrast to the system illustrated in FIG. 12. The cable 40 is laid to connect the master device 20 to the target device 30. In this case, as illustrated in FIG. 14, the data relay apparatus 10 according to the present embodiment is inserted in between the cable 40 and the master device 20.

Figure 15A:
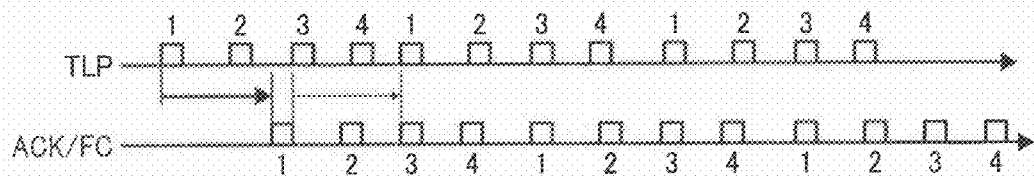
FIG. 15A is an exemplary timing diagram of the packet transfer between the master device and the data relay apparatus according to the first embodiment.
Figure 15B:
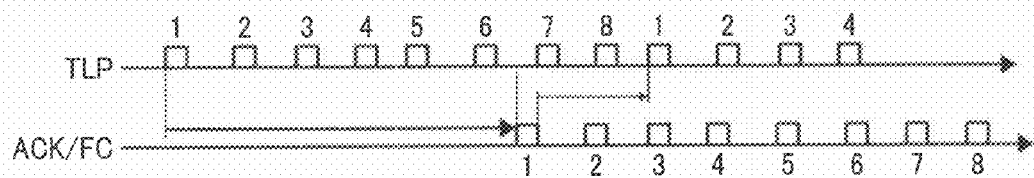
FIG. 15B is an exemplary timing diagram of the packet transfer between the data relay apparatus according to the first embodiment and the target device.

Once the packet communication starts, the data relay apparatus 10 allocates a 4-step buffer on the side of the master device 20 and allocates an 8-step buffer on the side of the cable 40. FIG. 15A is an exemplary timing diagram of the packet transfer between the master device 20 and the data relay apparatus 10. FIG. 15B is an exemplary timing diagram of the packet transfer between the data relay apparatus 10 and the target device 30. The delay time in the packet transfer between the data relay apparatus 10 and the target device 30 is longer than the delay time between the data relay apparatus 10 and the master device 20. However, since an 8-step buffer is allocated on the side of the cable 40 with respect to the data relay apparatus 10 according to the present embodiment, it is possible to continue efficient data transfer without interruption.

As described above, even if no consideration is given to cable connection or even in the case of performing the packet transfer with a master device having a small buffer size via a cable, using the data relay apparatus 10 according to the present embodiment makes it possible to continue the data transfer without allowing the data transfer efficiency to decrease. Moreover, the same effect can be achieved even if the master device has a different buffer size than the buffer size of the target device.

Regarding a modification example of the data relay apparatus 10 according to the present embodiment, consider a case when the first delay time and the second delay time can be calculated in advance based on the response time from a device connected to the data relay apparatus 10 either directly or via a cable. In that case, the first delay time and the second delay time are calculated in advance and a memory map created based on those values is stored in the memory map storing unit 304. That makes it possible to restrict the first delay detecting unit 128 in the first port 100 and the second delay detecting unit 228 in the second port 200 from performing operations. Alternatively, it also becomes possible to not include the first delay detecting unit 128 and the second delay detecting unit 228 in the data relay apparatus 10.

Figure 25:
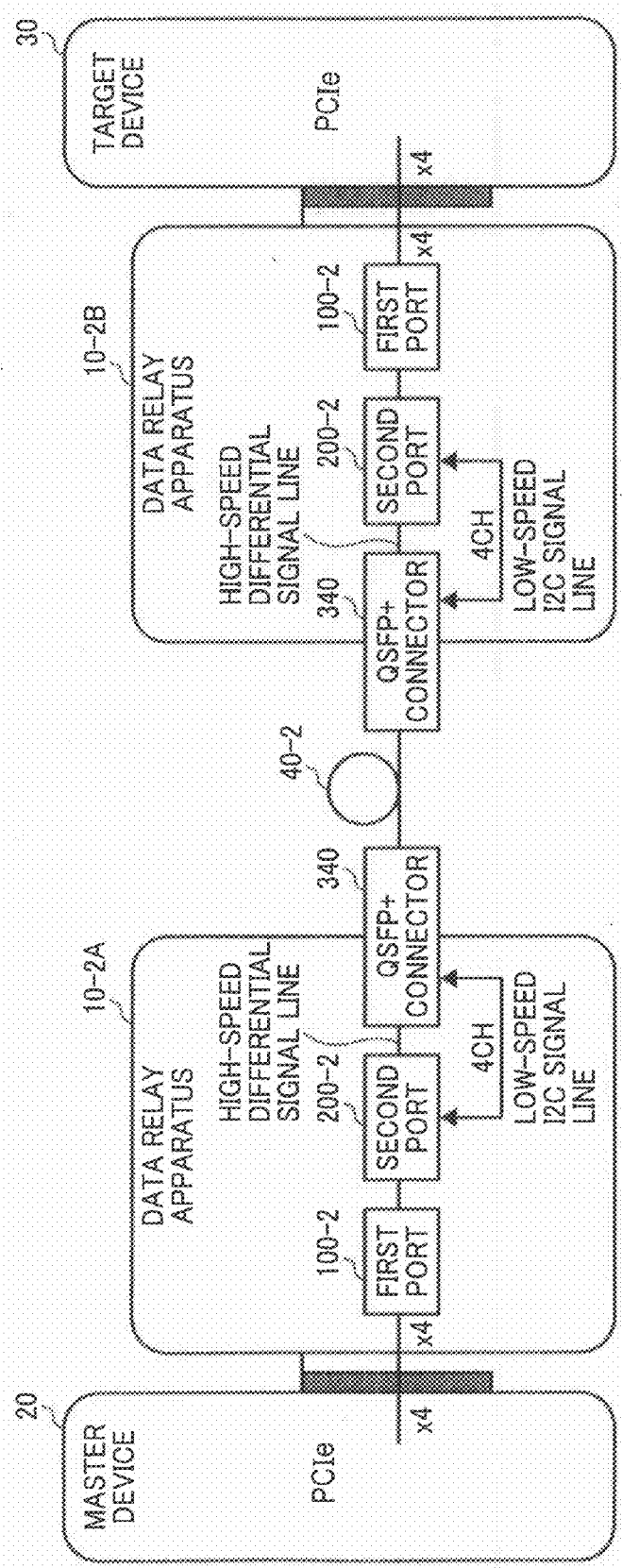
FIG. 25 is a block diagram of an exemplary configuration including data relay apparatuses according to a modification example of the first embodiment.
Figure 27B:
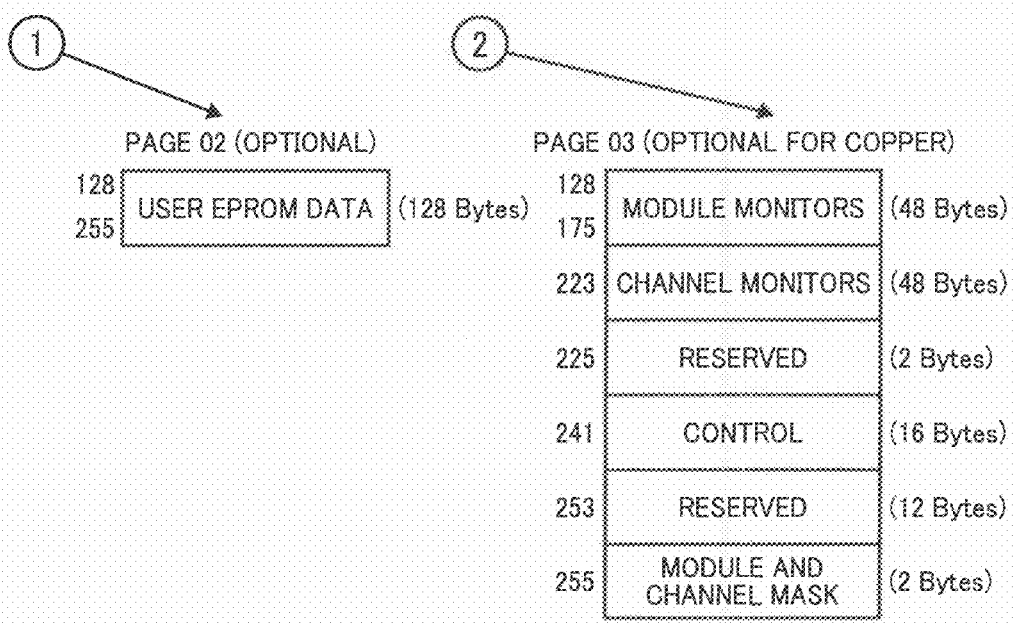
FIG. 27 is a schematic diagram of a register map defined by the QSFP+ standard.

FIG. 25 is a block diagram of an exemplary configuration of a system including data relay apparatuses 10-2 not including both of the first delay detecting unit 128 and the second delay detecting unit 228. In this example, a cable 40-2 that is compliant to the quad small form-factor pluggable plus (QSFP+) standard is used for cable connection. A QSFP+ connector 340 is specified to be able to access internal register information via an inter-integrated (I2C) serial bus. FIG. 27 is a schematic diagram of a register map defined by the QSFP+ standard. As illustrated in FIG. 27, a base ID field 2701 is provided in the register map. FIG. 28 illustrates an exemplary data configuration of the base ID field. As illustrated in FIG. 28, in the base ID field is recorded the cable length on a meter-by-meter basis. Thus, by reading that address from the I2C serial bus, it is possible to detect the length of the connected cable. In order to read the information regarding the cable length, each data relay apparatuses 10-2 is connected not only to the QSFP+ connector 340 and a high-speed differential signal line but also to a low-speed I2C signal line for register control.

Figure 26:
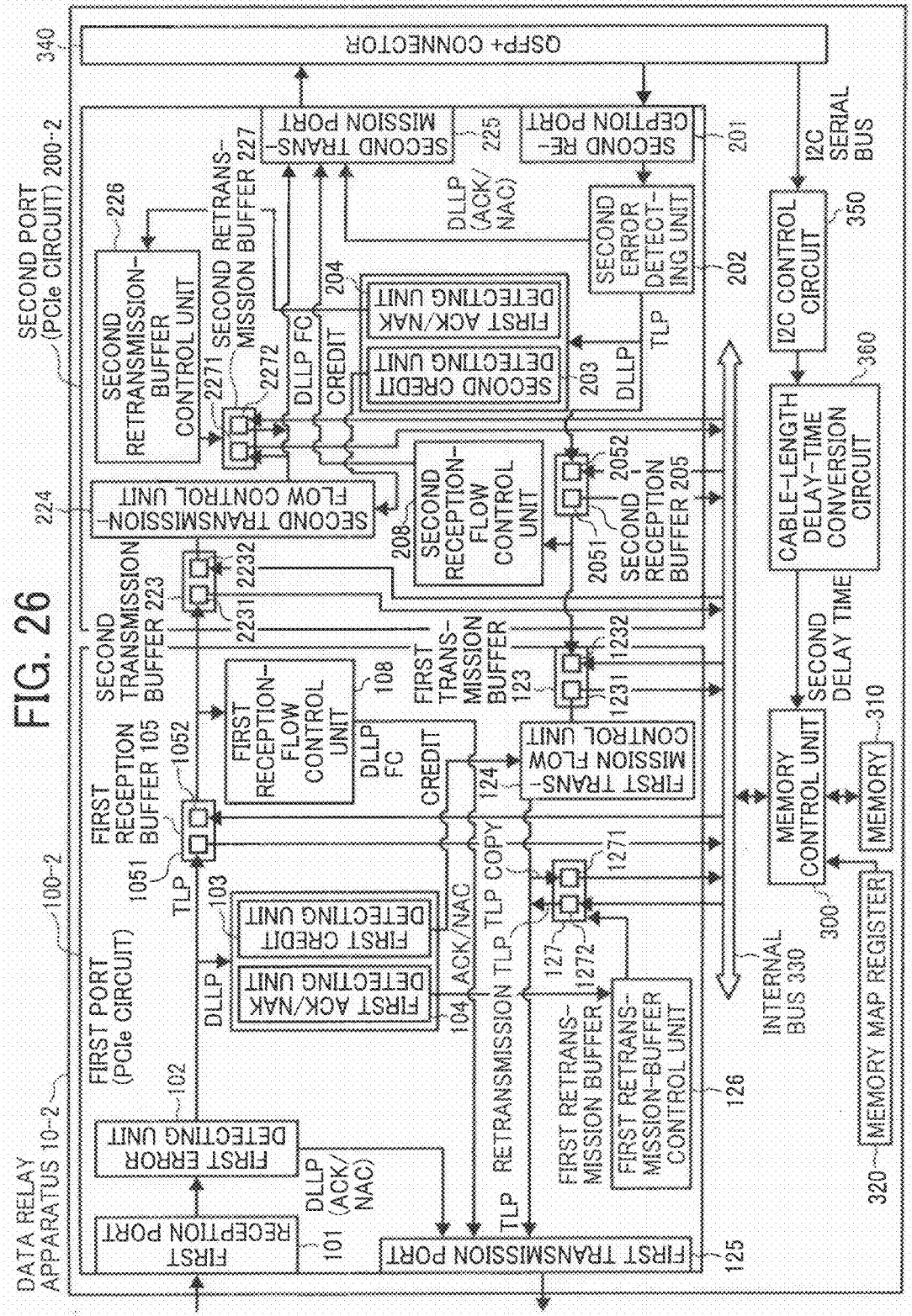
FIG. 26 is a block diagram of an exemplary configuration of the data relay apparatus according to the modification example of the first embodiment.

FIG. 26 is a block diagram of an exemplary configuration of the data relay apparatus 10-2. The difference with the configuration illustrated in FIG. 1 is as follows: the first delay detecting unit 128 and the second delay detecting unit 228 are not provided therein; an I2C control circuit 350 is newly provided for reading the cable length information from the QSFP+ connector 340 via the I2C serial bus; and a cable-length delay-time conversion circuit 360 for converting the read cable length information into the delay time that occurs. The I2C control circuit 350 is connected to the I2C signal line for register control of the QSFP+ connector 340. The second reception port 201 and the second transmission port 225 are connected to the high-speed differential signal line of the QSFP+ connector 340. Based on the delay time per meter and the read cable length information, the cable-length delay-time conversion circuit 360 can calculate the delay information of a second port 200-2 by estimating, but not by measuring, the response delay (the second delay time) of packets during the communication.

For example, when the value "100 m" is read from the register, the cable-length delay-time conversion circuit 360 calculates the time taken from the packet transmission up to the response of an ACK packet or an FC packet as follows: delay time per meter×cable length×2 (by taking into consideration of the back-and-forth motion because first the request is issued and then the response is received)=5 nanoseconds×100 meters×2 nanoseconds=1000 nanoseconds. As a result, it becomes possible to statically estimate an approximate calculation that is close to the dynamically-measured result using the delay time detecting circuits (the first delay detecting unit 128 and the second delay detecting unit 228) as described in the first embodiment.

Regarding a first port 100-2, since no cable is used for connection, the delay time can be estimated in advance as a fixed value. However, regarding the second port 200-2, the delay time varies according to the length of the connected cable. Thus, by reading the cable length information from the QSFP+ connector 340, it becomes possible to estimate the delay time and accordingly adjust the buffer allocation.

Second Embodiment

Figure 16:
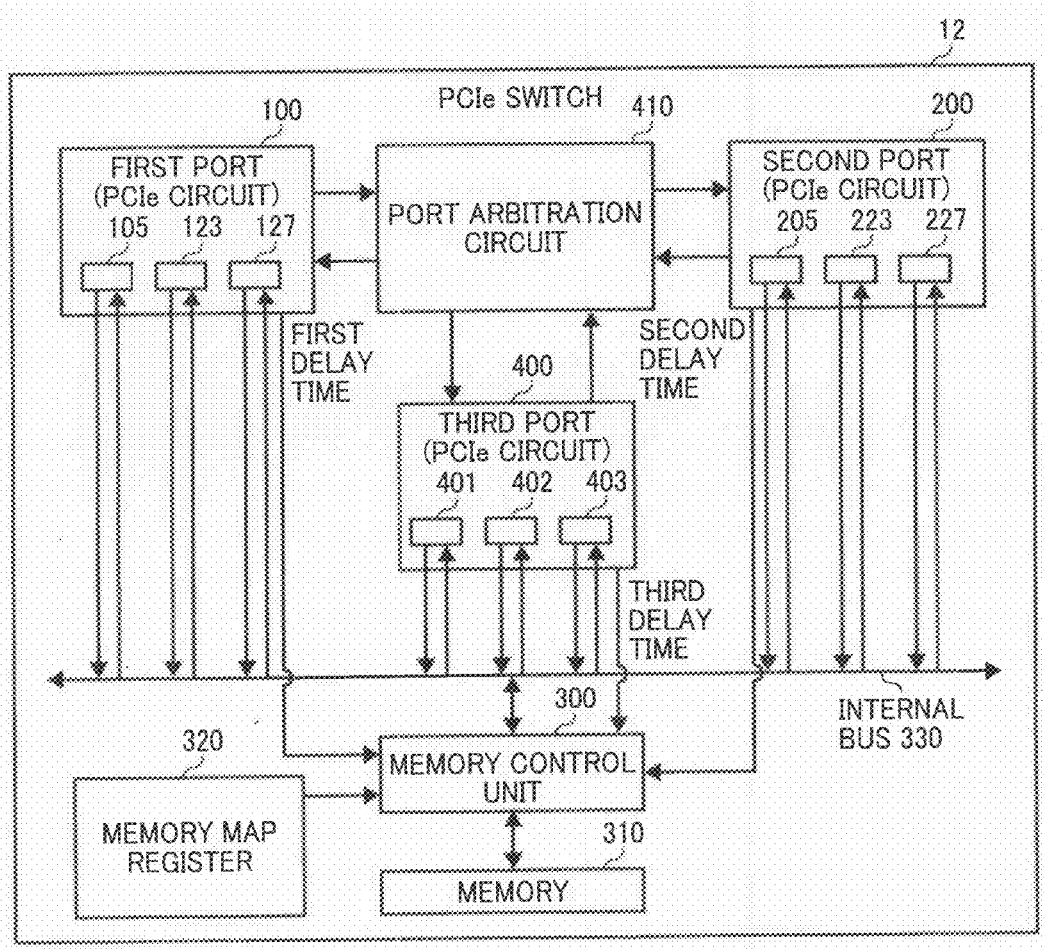
FIG. 16 is a block diagram of an exemplary configuration of a PCIe switch functioning as a data transfer device according to a second embodiment of the present invention.
Figure 19A:
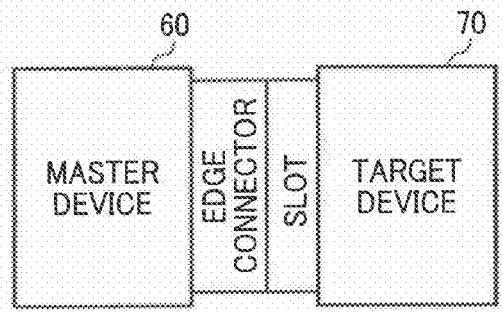
FIG. 19A is a schematic diagram of an example when a master device and a target device are directly connected to each other.
Figure 19B:
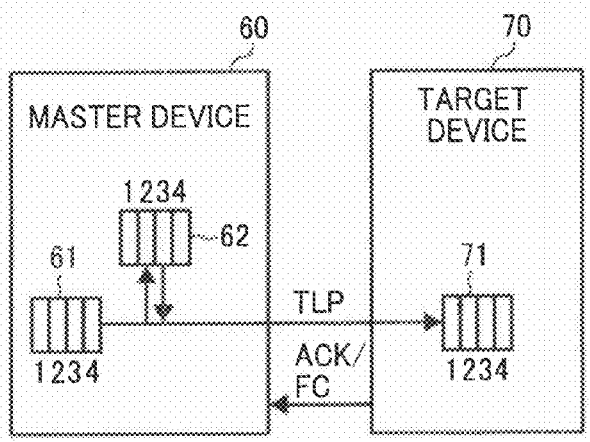
FIG. 19B is a schematic diagram of buffer configurations of the master device and the target device illustrated in FIG. 19A.
Figure 19C:
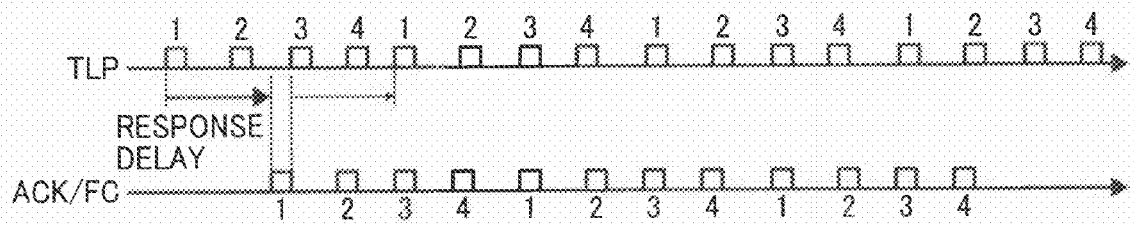
FIG. 19C is a timing diagram for explaining an example of a response delay.
Figure 20A:
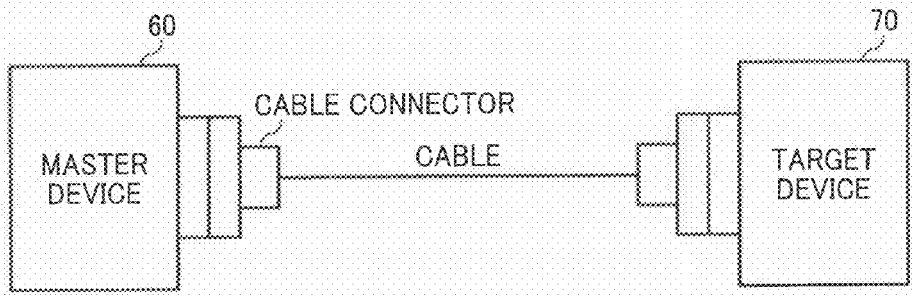
FIG. 20A is a schematic diagram of an example when the master device and the target device are connected by a cable.
Figure 20B:
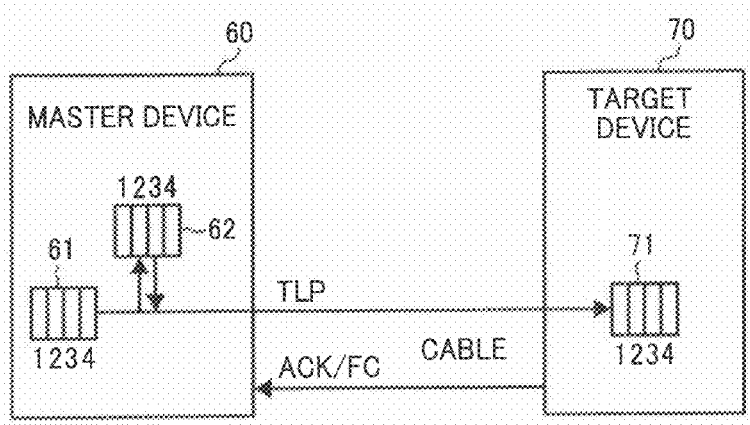
FIG. 20B is a schematic diagram of exemplary buffer configurations of the master device and the target device.
Figure 20C:
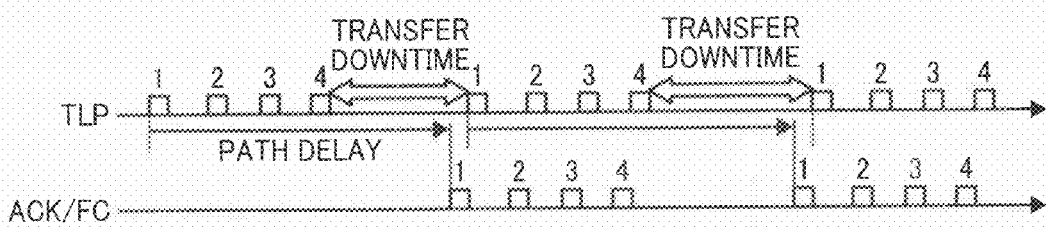
FIG. 20C is a timing diagram for explaining an example of response delay.

FIG. 16 is a block diagram of an exemplary configuration of a PCIe switch 12 functioning as a data relay device that is a data transfer device according to a second embodiment of the present invention. The PCIe switch 12 includes the first port 100 and the second port 200 as well as includes a third port (PCIe circuit) 400 that has an identical configuration to the configurations of the first port 100 and the second port 200. That is, the third port 400 includes a third reception buffer 401, a third transmission buffer 402, and a third retransmission buffer 403. Each of the buffers 401 to 403 carries out packet data (TLP) transfer with the memory 310 via the internal bus 330. In this way, since the PCIe switch 12 includes a plurality of ports, it is possible to perform mutual communication with a plurality of devices.

The memory control unit 300 refers to a memory map having the buffer space allocated to the first port 100, the second port 200, and the third port 400 so as to control the writing of packet data from each port to the memory 310 and controls the reading of the packet data by each port from the memory 310.

The PCIe switch 12 further includes a port arbitration circuit 410. The port arbitration circuit 410 selects a port as the transfer destination of the packet data from among the ports. Besides, if more than one transfer source ports simultaneously compete for transferring packet data to the same transfer destination port, then the port arbitration circuit 410 selects a transfer source port having priority for the transfer.

Other than the abovementioned configuration and operations, the PCIe switch 12 is identical to the data relay apparatus 10 according to the first embodiment.

FIG. 17 is a schematic diagram of an example of the application of the PCIe switch 12 according to the second embodiment. In a system illustrated in FIG. 17, a PCIe switch 12A is directly connected to the master device 20 and to a target device 30A and is also connected to a cable 40A. A PCIe switch 12B is connected to the cable 40A, a cable 40B, and a target device 30B. Meanwhile, the data relay apparatus 10 according to the first embodiment is inserted in between a target device 30C and the cable 40B.

In the system illustrated in FIG. 17, from among the ports in the PCIe switch 12A, the ports connected to the master device 20 and the target device 30A are directly connected to the respective devices without the use a cable. Hence, those ports have a shorter response time as compared to the port connected to the cable 40A. Consequently, as compared to the port connected to the cable 40A, a smaller buffer space is allocated to the ports connected to the master device 20 and the target device 30A.

On the other hand, regarding the port connected to the cable 40A, the response time from the target device 30B connected via the cable 40A and the PCIe switch 12B or the response time from the target device 30C connected via the cable 40A, the PCIe switch 12B, and the cable 40B is relatively longer thereby requiring a large buffer space. In this case, the timing diagrams of the packet data transfer are identical to the timing diagrams illustrated in FIGS. 11A to 11C, FIGS. 13A and 13B, and FIGS. 15A and 15B.

In the system illustrated in FIG. 17, since the PCIe switch 12 according to the present embodiment is allocated with buffers according to the delay time (response time), it is possible to carry out the data transfer in an efficient manner without getting restricted by the connection mode of cables or connectors.

Other than the abovementioned description, the configuration and operations of the PCIe switch 12 are identical to the configuration and operations of the data relay apparatus 10. Meanwhile, regarding a modification example of the data relay apparatus according to the second embodiment, consider a case when the first delay time and the second delay time can be calculated in advance from the response time from a device connected to the data relay apparatus either directly or via a cable. In that case, the first delay time and the second delay time are calculated in advance and a memory map created based on those values is stored in the memory map storing unit 304. That makes it possible to restrict the delay detecting unit in each port from performing operations. Alternatively, it is also possible not to include the delay detecting units. Moreover, in a system having QSFP+ cable connection, it is possible to dispose a circuit for obtaining the cable length information via the I2C serial bus from the QSFP+ connector 340 as illustrated in FIG. 26 as the modification example of the first embodiment. Consequently, it becomes possible to statically detect the delay time occurring in the cable connection ports.

According to an aspect of the present invention, it becomes possible to prevent the occurrence of a response delay that affects the data transfer efficiency.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A data transfer apparatus comprising:
   a first port and a second port that communicate data;
   a memory unit that stores the data;
   a securing unit that secures, when a first time period starting from transmission of data up to reception of a response to transmitted data at the first port is longer than a second time period starting from transmission of data up to reception of a response to transmitted data at the second port, a first memory space that is used in data transfer in the first port so as for the first memory space to have a larger size than a size of a second memory space used in data transfer in the second port, the securing unit securing a size of the first memory space and a size of the second memory space based on a ratio of duration of the first time period and duration of the second time period; and
   a dividing unit that divides each of the first memory space and the second memory space into a reception buffer space, a transmission buffer space, and a retransmission buffer space, the retransmission buffer space storing a packet to be retransmitted responsive to receiving a negative acknowledgment (NAK).

2. The data transfer apparatus according to claim 1, further comprising:
   a first measuring unit that measures the first time period, and
   a second measuring unit that measures the second time period, wherein based on the first time period measured by the first measuring unit and the second time period measured by the second measuring unit.

3. The data transfer apparatus according to claim 1, further comprising:
a calculating unit that calculates the second time period based on length of a cable connected to the second port, and
when the first time period is longer than the second time period calculated by the calculating unit, the securing unit secures the size of the first memory space to be larger than the size of the second memory space.

4. The data transfer apparatus according to claim 1, wherein
each of the first port and the second port is a port compliant to peripheral component interconnect (PCI) express standard, and
the first time period and the second time period are based on transmission of a transaction layer packet (TLP) up to reception of an acknowledgement (ACK) or the negative acknowledgment (NAK) as a response to transmitted TLP in the first port and the second port, respectively.

5. The data transfer apparatus according to claim 1, wherein
the securing unit secures sizes of each of the reception buffer space, the transmission buffer space, and the retransmission buffer space in the first memory space that are used for data transfer in the first port to have a larger size than sizes of each of the reception buffer space, the transmission buffer space, and the retransmission buffer space in the second memory space that are used for data transfer in the second port.

6. The data transfer apparatus according to claim 1, wherein a respective first portion of each of the reception buffer space, the transmission buffer space, and the retransmission buffer space in the first memory is divided from the first memory space, and a respective second portion of each of the reception buffer space, the transmission buffer space, and the retransmission buffer space in the second memory is divided from the second memory space such that each of the respective first portions is larger in size than each of the respective second portions.

7. A data transfer device comprising:
a first port and a second port that communicate data;
a memory unit that stores the data;
a securing unit that secures, when a first time period starting from transmission of data up to reception of a response to transmitted data at the first port is longer than a second time period starting from transmission of data up to reception of a response to transmitted data at the second port, a first memory space that is used in data transfer in the first port so as for the first memory space to have a larger size than a size of a second memory space used in data transfer in the second port, the securing unit securing a size of the first memory space and a size of the second memory space based on a ratio of duration of the first time period and duration of the second time period; and
a dividing unit that divides each of the first memory space and the second memory space into a reception buffer space, a transmission buffer space, and a retransmission buffer space, the retransmission buffer space storing a packet to be retransmitted responsive to receiving a negative acknowledgment (NAK).

8. The data transfer device according to claim 7, wherein a respective first portion of each of the reception buffer space, the transmission buffer space, and the retransmission buffer space in the first memory is divided from the first memory space, and a respective second portion of each of the reception buffer space, the transmission buffer space, and the retransmission buffer space in the second memory is divided from the second memory space such that each of the respective first portions is larger in size than each of the respective second portions.

9. A data transfer method in a data transfer device that includes a first port, a second port, a securing unit, and a dividing unit, the method comprising:
transmitting data by the first port;
transmitting data by the second port;
securing, by the securing unit, when a first time period starting from transmission of data up to reception of a response to transmitted data at the first port is longer than a second time period starting from transmission of data up to reception of a response to transmitted data at the second port, a first memory space that is used in data transfer in the first port so as for the first memory size to have a larger size than a size of a second memory space used in data transfer in the second port, the securing unit securing a size of the first memory space and a size of the second memory space based on a ratio of duration of the first time period and duration of the second time period; and
dividing, by the dividing unit, each of the first memory space and the second memory space into a reception buffer space, a transmission buffer space, and a retransmission buffer space, the retransmission buffer space storing a packet to be retransmitted responsive to receiving a negative acknowledgment (NAK).

10. The data transfer method according to claim 9, wherein a respective first portion of each of the reception buffer space, the transmission buffer space, and the retransmission buffer space in the first memory is divided from the first memory space, and a respective second portion of each of the reception buffer space, the transmission buffer space, and the retransmission buffer space in the second memory is divided from the second memory space such that each of the respective first portions is larger in size than each of the respective second portions.

* * * * *